United States Patent [19]
Benaloh et al.

[11] Patent Number: 5,724,279
[45] Date of Patent: Mar. 3, 1998

[54] COMPUTER-IMPLEMENTED METHOD AND COMPUTER FOR PERFORMING MODULAR REDUCTION

[75] Inventors: Josh Benaloh, Redmond; Wei Dai, Bellevue, both of Wash.

[73] Assignee: Microsoft Corporation, Redmond, Wash.

[21] Appl. No.: 519,600

[22] Filed: Aug. 25, 1995

[51] Int. Cl.[6] .................................................. G06F 7/38
[52] U.S. Cl. ........................................................ 364/746
[58] Field of Search ................................ 364/736, 746, 364/746.1; 380/28–30

[56] References Cited

U.S. PATENT DOCUMENTS

| | | | |
|---|---|---|---|
| 4,538,237 | 8/1985 | Circello | 364/746 |
| 4,949,293 | 8/1990 | Kawamura et al. | 364/746 |
| 5,499,299 | 3/1996 | Takenaka et al. | 380/28 |
| 5,572,454 | 11/1996 | Lee et al. | 364/746.1 |

*Primary Examiner*—Chuong Dinh Ngo
*Attorney, Agent, or Firm*—Lee & Hayes, PLLC

[57] ABSTRACT

This invention provides a computer-implemented method for performing a modular reduction operation "X mod M" and doing modular arithmetic on a computer. In a first stage of the method, the number $X=<x_k x_{k-1} \ldots x_1 x_0>$, written in base $\alpha$, is reduced from k+1 blocks to an n+1 block integer Y that is equivalent to X modulo M. The stage one process is achieved via a reduce-and-compensate scheme that involves a series of simple multiply and add/subtract operations that are much faster than conventional techniques for performing the division remainder operation "X mod M." The reduction phase requires reducing the number X to an intermediate value that is equal to X mod $\alpha^k$. The compensate phase requires adjustment by an amount sufficient to produce an incrementally reduced value $X_R$ which is equivalent to X modulo M. This compensate phase can be implemented by adding back a multiple of $\alpha^{n+1}$ mod M, or by subtracting a multiple of $M-(\alpha^{n+1} \mod M)$. The stage two process further reduces the n+1 block integer Y to an equivalent n block integer Z. Although intermediate computations may stop after stage one or stage two, the resulting integer Z might be larger than the modulus M, and thus still require further reduction to produce a final result. Accordingly, the third stage involves reducing the integer Z to an equivalent remainder R such that $0 \leq R < M$.

50 Claims, 10 Drawing Sheets

STAGE 1

COMPUTER-IMPLEMENTED METHOD AND COMPUTER FOR PERFORMING MODULAR REDUCTION

TECHNICAL FIELD

This invention relates to computers and computer-implemented methods for performing a modular reduction operation "X mod M" that is used in large integer computations, such as those commonly occurring in cryptographic systems.

BACKGROUND OF THE INVENTION

A common arithmetic operation performed by a computer when performing large integer arithmetic is the "modular reduction" operation, or simply "modulo" operation. The modulo operation is an arithmetic operation whose result is the remainder of a division operation. It is expressed as "X mod M," where X is a number written in some base and M is the "modulus." The result of X mod M is the remainder of the number X divided by the modulus M. As a simple example, the modulo operation 17 mod 3 yields a result of 2, because 17 divided by 3 yields a remainder 2. Because it produces a remainder, the modulo operation is often alternately referred to as the "division remainder" operation.

Historically, the modular reduction operation was conducted using a trial-and-error division process similar to familiar long-hand division taught in grade school. For the "X mod M" operation, the computer would guess a multiple of the divisor M in relation to the first few places of the dividend X. If subtracting the multiple of the divisor M from the first few places of the dividend X did not yield a positive value less than the divisor M, a new guess was tried. The process continued, trial by trial, until the division was completed and the remainder derived. This process required a substantial amount of processing power and time. Instead of the oversimplified "17 mod 3" computation, consider a modular reduction operation where X is a 500 digit number and M is a 200 digit number. On paper, this would require substantially more time than calculating "17 mod 3"; analogously, it requires substantially more processing time to perform modular reduction on large integers than on small integers.

In recent years, there has been much effort to develop faster methods for large integer arithmetic and modular reduction. One widely-used technique is a modular reduction method proposed by P. L. Montgomery which is performed without trial division. The Montgomery technique requires a sophisticated mapping of the "X mod M" operation into another form where simpler and more efficient operations can be made. The result is then converted back to the original form. This mapping method is described in detail in an article entitled, "Modular multiplication without trial division" by P. L. Montgomery, *Mathematics of Computation*, Vol. 44, 1985. pp. 519–521. However, the Montgomery technique is conceptually difficult and is limited by special constraints. For example, the method only works with odd integers, and the length (size) of each odd integer must be twice the length (size) of the modulus M. It would be beneficial to provide a better method for performing modular reduction that is faster and not limited by such special constraints.

Today, computers are becoming increasingly more powerful and are capable of handling very large integer numbers. One particular area involving large integer computations is cryptography, and more specifically, public-key cryptography involving asymmetric key pairs. An "asymmetric" cryptographic key pair consists of two separate keys, a first key to manipulate data in one way and a second key to convert the manipulated data back to its original form. The keys are based upon a mathematical relationship in which one key cannot be calculated (at least in any reasonable amount of time) from the other key. Cryptographic key pairs can be used for different functions, such as encryption, decryption, digital signing, signature verification, and authentication. As an example, encryption and decryption using an asymmetric key pair can be represented as follows:

$$E_{Kpub}(T)=T'$$

$$D_{Kpri}(T')=T$$

where "$E_{Kpub}$" is an encryption function using a public key "Kpub," "T" is a plaintext message, "T'" is an encrypted version of the plaintext message, and "$D_{Kpri}$" is a decryption function using the private key "Kpri". The inverse is also true in that a message can be "signed" using the private key and the signature can be verified using the public key.

In a public key system, the public key is distributed to other parties and the private key is maintained in confidence. The asymmetric public and private keys ensure two results. First, only the holder of the private key can decrypt a message that is encrypted with the corresponding public key. Second, if another party decrypts a message using the public key, that party can be assured that the message was encrypted by the private key and thus originated with presumably the holder of the private key. An example asymmetric cipher is the well-known RSA cryptographic cipher named for the creators Rivest, Shamir, and Adleman.

The strength and security of the public key system is inherent in the size of the keys. Using present-day computers, a public key system might employ asymmetric keys ranging from weak 256-bit keys to very strong 2048-bit keys. It is readily foreseeable that key sizes will continue to increase for added strength as processing speeds improve and computers become capable of rapid handling of even larger keys.

As a result, virtually all public-key cryptography depends upon arithmetic operations involving very large integers. Most of the arithmetic operations are fairly straightforward, and require little processing resources. The modular reduction operation, however, is the most cumbersome and time-consuming arithmetic operation. For example, one common implementation of the RSA cipher for encryption and decryption of text T involves a computation known as "modular exponentiation", given as follows:

$$\text{RSA Encryption: } (T)^E \bmod M = T'$$

$$\text{RSA Decryption: } (T')^D \bmod M = T$$

Repeated multiplication is used to perform the power operations $(T)^E$ and $(T')^D$ and modular reduction is employed for each iteration to keep the numbers manageable. That is, during encryption, the process entails first multiplication of T by T, and then modular reduction of the product of that multiplication to yield a reduced value. Subsequent iterations are performed by further multiplications—each followed by a modular reduction of the resultant product.

Without modular reduction, an example thousand-bit text T raised to a thousand-bit power would quickly produce unmanageable large numbers. In fact, the number of bits in such a number would be far greater than the number of atoms in the known universe. Thus, the modulo operation is used frequently in cryptography for standard public-key functions and usually accounts for most of the time consumed by the standard public-key functions.

Advances in reducing the processing time to perform the modulo operation, such as that contributed by Montgomery, routinely find wide acceptance and adoption because they translate directly into performance improvements in higher-level functions. Despite some gains that have been made, the modular reduction operation remains a bottleneck when computing large integers. Accordingly, there remains a need to further improve the methods for performing the modular reduction operation. Additionally, continued advances in the strength of cryptographic systems depends in large part upon more efficient modular reduction to allow use of increasingly larger keys.

SUMMARY OF THE INVENTION

This invention provides a computer-implemented method for performing a modular reduction operation "X mod M" on a computer that can be used in cryptography functions. Generally, three stages are involved to compute the remainder of an "X mod M" operation, where X is written in k+1 data blocks and M is written in n data blocks. In a first stage of the method, the number X is reduced from k+1 blocks to an equivalent n+1 block integer Y. In a second stage, the partially reduced integer Y is further reduced from n+1 blocks to an n block integer Z. In a third stage, the integer Z is reduced to a remainder R, such that $0 \leq R < M$, which is the solution of the "X mod M" operation.

The computer-implemented method according to an aspect of this invention is particularly directed to the stage one operation of reducing the initial large integer X to a reduced value Y. Stage one constitutes most of the computations and thus, improvements to this stage significantly affect the overall performance of the modular reduction operation. In the described embodiment, X is a number written in base $\alpha$ having k+1 blocks $x_i$ (i=0 to k) which can be represented as $X = <x_k x_{k-1} \ldots x_1 x_0>$. The term "blocks" is terminology for units in a number, such as digits in base ten or bits in base two. M is a modulus having n blocks, when n<k+1 which can be represented as $M = <m_{n-1} m_{n-2} \ldots m_1 m_0>$.

In stage one, the first step is to define a constant $U = \alpha^{n+1} \mod M$, where n is the number of blocks in the modulus M. Two numbers A and B are said to be equivalent in modulo M if A mod M=B mod M. For example, 17 and 14 are equivalent modulo 3 because "17 mod 3" and "14 mod 3" both produce a remainder of 2.

The next step is to produce an incrementally reduced value $X_R$ by reducing X to a value equal to X mod $\alpha^k$ and then adding back $x_k * U * \alpha^{k-n-1}$ to compensate for the reduction. The add back portion is equivalent in modulo M to the amount reduced from the number X. For instance, to perform 45,397 mod 34 in base 10, where n=2, k+1=5, and $U = 10^3 \mod 34 = 14$, the processor will produce an incrementally reduced value $X_R$ that equals 45,397 mod $10^4$ + (4*14*10)=5,397+560=5,957. Notice that the add back portion "560" is equivalent in modulo 34 to the amount "40,000" reduced from 45,397; that is, 560 mod 34=16=40,000 mod 34. Notice also that $X_R$ is equivalent in modulo 34 to the original X; that is, 45,397 mod 34=7=5,957 mod 34. Thus, the reduce-and-add process shrinks the original number to a smaller modulo equivalent value. An overflow condition might occur if the addition causes $X_R \geq \alpha^k$, but this can be easily accounted for by a simple correction operation.

Notice that the method effectively transforms a rather difficult modular operation into a series of simple arithmetic multiple and add operations. In implementation, the reduction component to obtain X mod $\alpha^k$ is achieved by simply dropping the most significant block (i.e., the "4" digit in the above example). Additionally, multiplication of powers of $\alpha$ is achieved by data shifting. Accordingly, the computer-implemented method is very fast.

In a second and slightly more efficient implementation, the step to determine value $X_R$ is achieved by reducing the number X to X mod $\alpha^k$ and then subtracting $x_k * V * \alpha^{k-n-1}$, where constant V is equal to M−U. To perform 45,397 mod 34 in base 10, where n=2, k+1=5, $U = 10^3 \mod 34 = 14$, and V=34−14=20, the processor will produce an incrementally reduced value $X_R$ that equals 45,397 mod $10^4$−(4*20*10)= 5,397−800=4,597. Notice that $X_R$ is equivalent in modulo 34 to the original X; that is, 45,397 mod 34=7=4,597 mod 34. In some instances, this subtraction might result in an underflow condition where the value $X_R$ is negative. In that case, the processor will in the next iteration subtract $x_{k-1}' * U * \alpha^{k-n-2}$, where $x_{k-1}' = \alpha - x_{k-1}$. The second implementation is a little more efficient because there is no correction operation for an underflow condition; rather, the underflow condition is accounted for on the fly during the next subtraction.

The partial reduction of stage one is continued for all blocks from k down to n+1 blocks. Following this iterative reduction process, the final $X_R$ will be the reduced integer Y of n+1 blocks. Stage two can then be performed to reduce the integer Y to an n block integer Z. A final stage three can be performed to reduce integer Z to a remainder R, such that $0 \leq R < M$.

The three-stage modular reduction process is useful in many different contexts to support functions involving large integer computations. One implementation described herein is an electronic commerce system which performs cryptographic functions. The modular reduction method is implemented in computers and smart cards used in the electronic commerce system to speed up the modular exponentiation operations used in public-key cryptographic functions.

DETAILED DESCRIPTION OF THE PREFERRED EMBODIMENT

The following discussion assumes that the reader is familiar with cryptography techniques and modulo operations. For a basic introduction of cryptography, the reader is directed to a text written by Bruce Schneier and entitled, "Applied Cryptography: Protocols, Algorithms, and Source Code in C," published by John Wiley & Sons with copyright 1994, which is hereby incorporated by reference. For discussion purposes, the computer-implemented method for performing modular reduction is first described below in its general form, without detailed reference to a preferred context. Thereafter, the computer-implemented method is described in the context of cryptography to exemplify its advantages.

Figure 1:
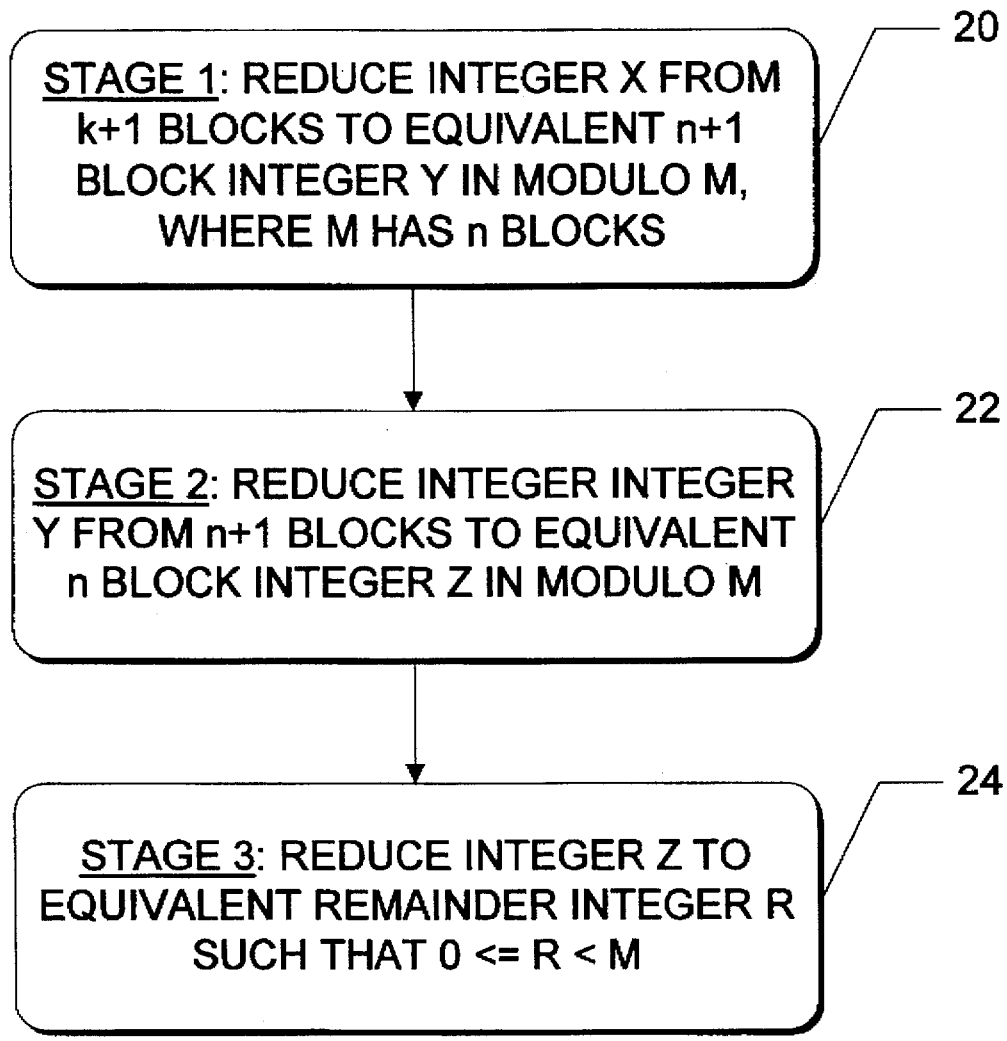
FIG. 1 is a flow diagram depicting three general stages in a computer-implemented method for performing modular reduction.

FIG. 1 shows general stages of a computer-implemented method for performing a modular reduction operation "X mod M" on a computer. The number X can be uniquely written in a base $\alpha$ (decimal, binary, hexadecimal, etc.) as having k+1 blocks. The term "blocks" is terminology for units that make up a number. In a decimal base ($\alpha$=10), blocks are represented as digits. The decimal number 59,284 has five blocks. In a binary base ($\alpha$=2), blocks are represented as bits. The binary number 10011010111 has eleven blocks. When implemented on a computer, the base for an m-bit computer might be set to be $\alpha=2^m$. For instance, a small 8-bit computer, such as a microprocessor employed on a smart card, is represented in base $\alpha=2^8$ and a larger 32-bit computer is represented in base $\alpha=2^{32}$. With such bases, a block might be in the form of an 8-bit byte or a 32-bit word.

The number X can be represented as $<x_k x_{k-1} \ldots x_1 x_0>$, where for each block $x_i$ (i=0 to k), $0 \leq x_i < \alpha$ so that $x_k$ is the first or most significant block (or digit or bit), $x_{k-1}$ is the second most significant block (or digit or bit), and so on.

The modulus M has n blocks which are fewer in number than the blocks in number X (i.e., n<k+1). The number M can be expressed as $<m_{n-1} m_{n-2} \ldots m_1 m_0>$, where for each block $m_i$ (i=0 to n−1), $0 \leq m_i < \alpha$ so that $m_{n-1}$ is a first or most significant block, $m_{n-2}$ is the second most significant block, and so on.

The three general stages shown in FIG. 1 perform modular reduction of a large integer X from k+1 blocks to an equivalent integer remainder R that has at most n blocks (i.e., the same or less than the modulus M), and $0 \leq R < M$. The three general steps are described initially in general terms in an effort to convey the process concepts. This general discussion is then followed by an in-depth description of these steps and detailed examples later in this disclosure.

At step 20 in FIG. 1, a first stage is performed to reduce X from k+1 blocks to an equivalent n+1 block integer Y. As used herein, the term "equivalence" means X is equivalent to Y in modulo M such that X mod M=Y mod M. At step 22, the partially reduced value Y is further reduced from n+1 blocks to an equivalent n block integer Z. However, the integer Z might still be greater than the modulus M. By definition, the division remainder operation "X mod M" yields a remainder R that is less than M, or more precisely $0 \leq R < M$. Accordingly, at step 24, a third and final stage reduces the integer Z to an equivalent remainder R such that $0 \leq R < M$.

The stage one reduction to a partially reduced value Y is of significance because it requires the vast majority of computations for the entire process. For instance, stage one might reduce a 500-block number X by a 50-block modulus M to a partially reduced value Y that has just 51 blocks (i.e., n+1=50+1=51). The reduction from 500 blocks to 51 blocks involves the vast majority of the computational work. The last two stages require comparatively very few computations to reduce Y (e.g., 51 blocks) to the ultimate remainder R (e.g., 50 blocks and less than M). Thus, the beneficial efficiencies of the computer-implemented method are found primarily in stage one.

It is important to recognize that it is not necessary in all cases to perform all three stages! For instance, the modular exponentiation "$X^E$ mod M" operation employed in public-key cryptographic functions, such as the well-known RSA cipher, utilizes many modular reductions of intermediate results. The intermediate modular reductions may be computed using only stage one or a combination of stages one and two. Stage three would then be performed only at the end of all intermediate reductions for the final result.

The intermediate processes can be optimized based upon the specifications of the computer, whereby certain computers might operate more efficiently if only stage one is performed for all intermediate modular reductions (i.e., handling values of n+1 or more blocks), while other computers might perform better if both stages one and two are performed for the intermediate modular reductions (i.e., handling values of n blocks). The performance tradeoff is whether sufficiently greater efficiencies are achieved by handling the slightly smaller n block Z (a result of stages one and two) to warrant the processing cost of performing a stage two reduction to reduce the slightly larger n+1 block Y to the n block Z in the first place. If the computer handles the n+1 block Y equally well, there may be no advantage to performing the stage two reduction during the intermediate modular reductions. Additionally, it might be more convenient for a computer to handle some larger block number greater than n+1 blocks, so that stage one need not be performed in its entirety for intermediate computations.

Stage 1

Figure 2:
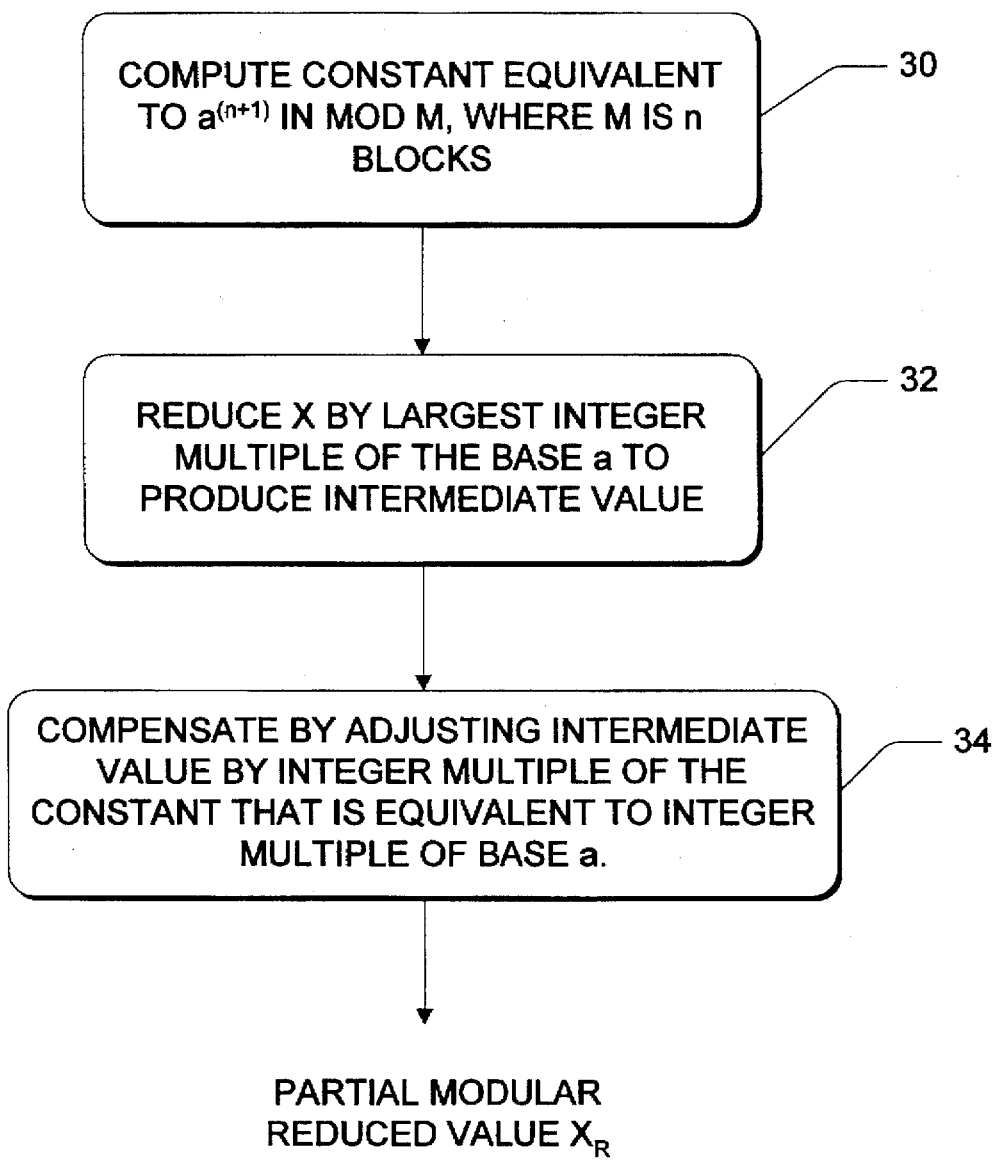
FIG. 2 is a flow diagram of general steps in a first stage of the FIG. 1 method.

FIGS. 2–6 show the stage one modular reduction method in more detail. FIG. 2 shows three general steps in a computer-implemented method for performing a modular reduction operation "X mod M" on a computer to arrive at a partially reduced value Y. As introduced above, X is a number with k+1 blocks written in base $\alpha$ and represented as $X=<x_k x_{k-1} \ldots x_1 x_0>$, and M is a modulus having n blocks (less than k+1 blocks) and represented as $M=<m_{n-1} m_{n-2} \ldots m_1 m_0>$. At step 30, a constant U is computed to equal $\alpha^{n+1}$ mod M. At step 32, the integer X is reduced by an integer multiple of $\alpha^{n+1}$ to yield an intermediate value that is less than $\alpha^{k+1}$ but not less than zero. To compensate for that reduction, step 34 requires that the intermediate value be adjusted an amount equal to an integer multiple of the constant U determined in step 30, or an integer multiple of the constant V, where V=M−U. The adjusting step 34 produces an incrementally reduced value $X_R$ that is equivalent modulo M to the number X.

Consider the following example. Suppose X is a five block integer 45,397 written in base 10 and the modulus M is a two block integer 34. Step 30 calls for precomputing a constant U that equals $\alpha^{n+1}$ mod M, where n is the number of blocks in the modulus M (in this case, two blocks). Step 30 yields the following value for constant U:

$$U = \alpha^{n+1} \bmod M = 1000 \bmod 34 = 14.$$

This initial modulo operation to precompute a constant U is performed using traditional modular computations. It need only be computed once for each modulus M used in modular reduction, and it can be reused for all subsequent modulo M reductions. Precomputing this constant actually introduces an extra step into the modular reduction method, but ultimately renders the overall process substantially more efficient. The constant V is a negative of constant U in relation to the modulus M, and is defined as follows:

$V=M-U=34-14=20$

Next, at step 32, the most significant block of the integer 45,397 is removed. This produces the following intermediate value:

Intermediate Value=45,397−40,000=5,397

Next, at step 34, the intermediate value is adjusted by adding an integer multiple of the constant U that is equivalent modulo M to the amount removed in the previous step. The computation of U above produced a value of 14 that is equivalent to $\alpha^{n+1}$ or 1000 in modulo 34. It holds that multiples of the 14/1000 relationship are also equivalent. For instance, 10,000 (i.e., 10×1000) is equivalent to 140 (i.e., 10×14). Additionally, the above computation of constant V was 20 for a constant U=14. Since V is the negative of U relative to modulus M, the intermediate value can alternatively be adjusted by subtracting an integer multiple of the constant V which is equivalent modulo M to adding the same integer multiple of the constant U. Multiples of this −20/14 relationship are likewise equivalent, such as −200 is equivalent to 140. The following summarizes these equivalencies:

$1,000 \equiv 14 \equiv -20$ $10,000 \equiv 140 \equiv -200$ $100,000 \equiv 1,400 \equiv -2,000$ $1,000,000 \equiv 14,000 \equiv -20,000$, and so on.

To arrive at the intermediate value of 5,397, an amount of 40,000 was subtracted from X. From the above equivalence examples, 10,000 is equivalent to 140 and hence, 4*10,000 is equivalent to 4*140. Thus, to compensate for a reduction of 4*10,000, the amount of 4*140, or 560, is added back to the intermediate value. This yields an incrementally reduced value $X_R$ as follows:

$X_R = 5,397+(4*140)=5,957.$

Notice that the incrementally reduced value $X_R$ is equivalent modulo M to the original value 45,397. That is, $45,397 \mod 34 = 7,$ and $5,957 \mod 34 = 7,$ $\therefore 45,397 \equiv 5,957 \text{ modulo } M=34.$ An alternative compensation can be achieved using constant V. To compensate for a reduction of 4 times 10,000, an amount equal to 4 times 200, or 800, can be subtracted from this intermediate value to yield an incrementally reduced value $X_R$ as follows:

$X_R = 5,397-(4*200)=4,597.$

Again, notice that the incrementally reduced value $X_R$ is equivalent modulo M to the original value 45,397. That is, $45,397 \mod 34 = 7,$ and $4,597 \mod 34 = 7,$ $\therefore 45,397 \equiv 4,597 \text{ modulo } M=34.$ The reduce-and-compensate scheme involves only simple arithmetic operations. In fact, the computer-implemented reduction step can be accomplished simply by dropping the most significant block in integer X without any computation, leaving only a multiplication and addition. Multiplication by powers of $\alpha$ can be accomplished through conventional shifting techniques, leaving only small multiplication and addition steps. Such arithmetic operations can be performed much more quickly than division.

Each repetition of steps 32 and 34 produces an incrementally reduced value $X_R$, which has one block fewer than the previous integer X. These last two steps 32 and 34 can therefore be repeated as many times as necessary to produce a convenient intermediate number, or until they produce a partially reduced value Y that has n+1 blocks. At that point, the computer process can continue to stage two (step 22 in FIG. 1) or the computer can simply work with the partial reduced value Y until a final result is required.

As seen in the example, there are two possible implementations of the partial modular reduction during stage one. One implementation entails compensating in step 34 by adding a multiple of constant U to the intermediate value. The other implementation entails compensating by subtracting a multiple of constant U or V from the intermediate value. Due to inherent computer designs, and their ability to handle overflow or underflow conditions, the second implementation is slightly more efficient. The two implementations are discussed separately below.

(a) First Implementation: Compensate by Addition

Figure 3:
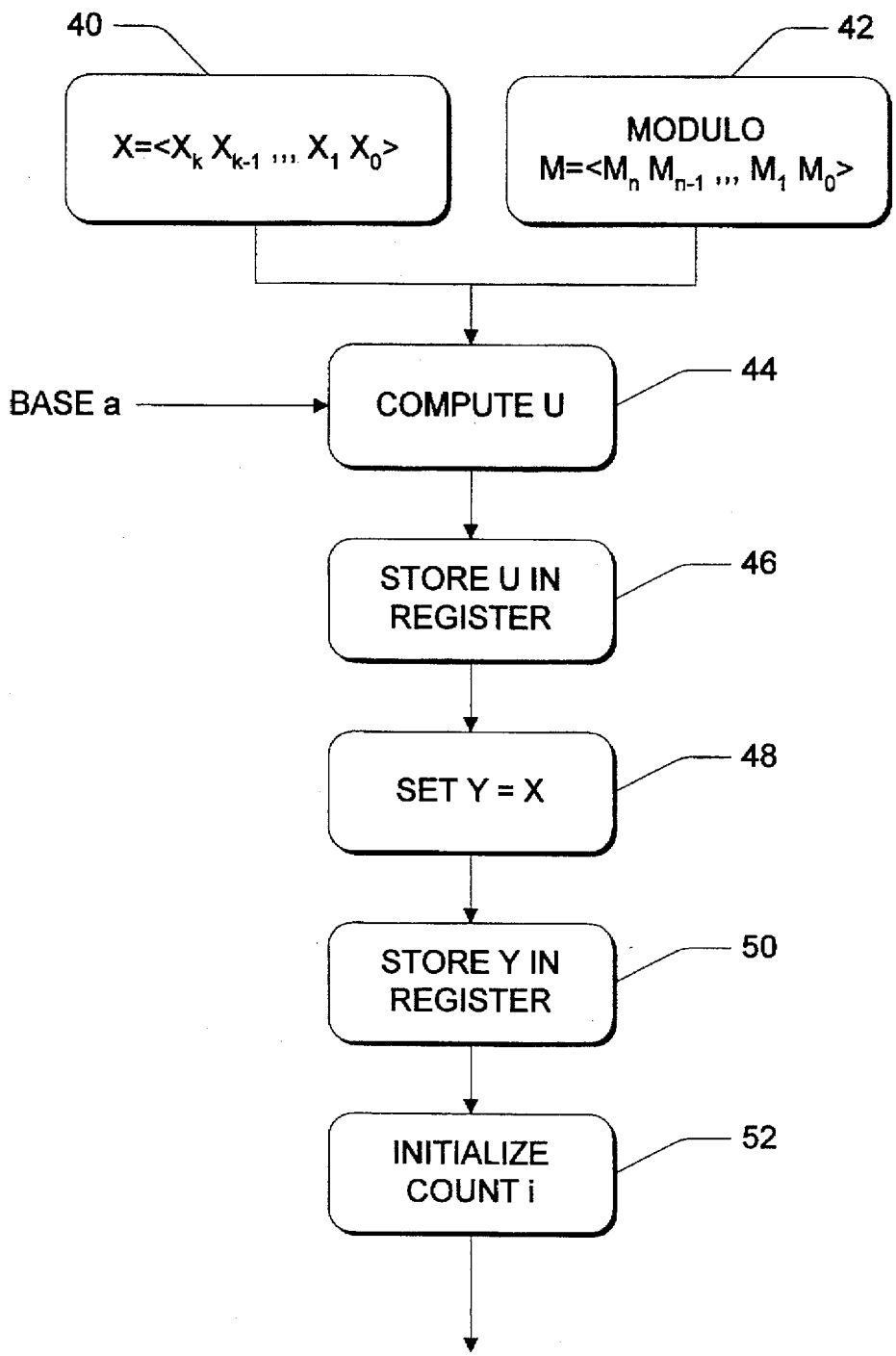
FIGS. 3 and 4 present a flow diagram of a first implementation of the stage one process for performing a modular reduction operation.
Figure 4:
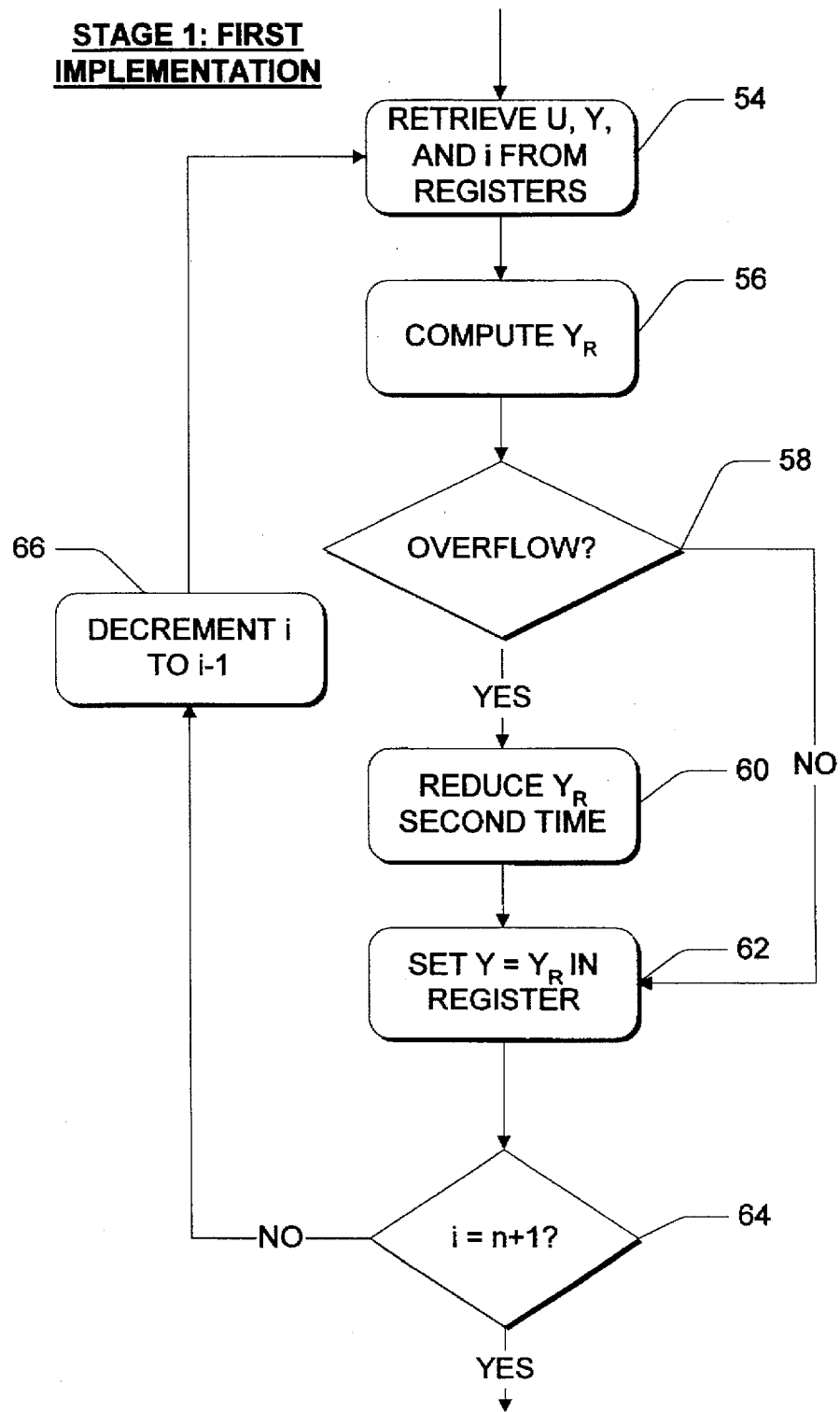

FIGS. 3 and 4 show a first version of a computer-implemented method for performing a modular reduction operation "X mod M" on a computer to arrive at a partially reduced value Y. At steps 40 and 42, the integer $X=<x_k x_{k-1} \ldots x_1 x_0>$ and the modulus $M=<m_{n-1} m_{n-2} \ldots m_1 m_0>$ are supplied to the computer processor. The integer X might be supplied from a memory location, a register, or directly from a computational device. The modulus M is held in memory or a register. At step 44, the computer processor is programmed to compute a constant U as follows:

$U = \alpha^{n+1} \mod M.$

The base $\alpha$ is either supplied to the processor from a register, or is inherently configured into the processor (e.g., a 32-bit processor might be configured to work in base $\alpha=2^{32}$). The data processor computes constant U using the traditional modulo operation. The constant U is then stored in a register for later use (step 46). Next, to reduce integer X down to partially reduced value Y using the iterative modular reduction process of reduce-and-compensate, the data processor initially sets variable Y equal to the value X (step 48). In this manner, initial variable $Y=<y_k y_{k-1} \ldots y_1 y_0>=<x_k x_{k-1} \ldots x_1 x_0>$, so that $y_k=x_k$, $y_{k-1}=x_{k-1}, \ldots, y_1=x_1$, and $y_0=x_0$. Variable Y is then stored in a temporary register or cache (step 50).

At step 52 in FIG. 3, the data processor initializes a count i in a count register to i=k. Next, at step 54 in FIG. 4, the value Y, constant U, and count i are retrieved from their respective registers and the reduction-and-compensate operation is performed in step 56 to compute an incrementally reduced partial value $Y_R$. The reduction-and-compensate operation in this case is a reduce-and-add back process that is represented as follows:

$Y_R = Y \mod \alpha^i + y_i * U * \alpha^{i-n-1}$ where $Y_R$ is an incremental partially reduced value that is equivalent to the value Y modulo M. The first or reduction component of the relationship, "Y mod $\alpha^i$", can be computed by the data processor in several different ways. One technique is to actually compute Y mod $\alpha^i$, which is rather straightforward since the modulus is a power of base $\alpha$. A second technique is to subtract the product $y_i*\alpha^i$ from the number X. A third technique is to simply drop the most significant block, the $y_i$ block, from the number X. All three techniques yield the same result, with the third technique being the fastest.

The incremental value $Y_R$ is desirably one block less than the previous Y value (which, in the first pass, is set equal to the original integer X). In some circumstances, however, the add back component of the relationship, or "$+y_i*U*\alpha^{i-n-1}$", yields an overflow condition where $Y_R \geq \alpha^i$. This causes an overflow flag to be set in the processor. Step 58 checks for this overflow condition. If the overflow flag is set (i.e., the "yes" branch from step 58), the processor is programmed to correct the overflow by performing an additional reduce-and-compensate of $Y_R$ by an amount equal to the following (step 60):

$$Y_R = Y_R \bmod \alpha^i + U*\alpha^{i-n-1}.$$

This secondary reduce-and-compensate is identical to the one performed earlier. Notice that the equation for this secondary step 60 differs only from the above relationship in that it omits the variable $y_i$ because this variable will be "1" under the overflow condition. If no overflow condition is present (i.e., the "no" branch from step 58), the secondary step 60 is bypassed.

At step 62, the processor places the incrementally reduced value $Y_R$ in the register to replace value Y in preparation for the next incremental reduction. At step 64, the processor determines whether the count i is equal to n+1, indicating that the number X has been reduced to a partially reduced value Y having n+1 blocks. If the count remains greater than n+1 (i.e., the "no" branch from step 64), the count register is decremented by 1 (i.e., i=i-1) and the reduce-and-add back process is repeated at steps 54–62. Otherwise, if the count is equal to n+1 (i.e., the "yes" branch from step 64), the stage one process is completed and the processor proceeds to perform stage 2, if desired, or halted.

The computer-implemented method of FIGS. 3 and 4 that is programmed into a data processor can be represented summarily by the following pseudo-code:

1) $U \leftarrow \alpha^{n+1} \bmod M$
2) $Y \leftarrow X$
3) For $i \leftarrow k$ down to n+1 do
4) $Y \leftarrow \langle y_{i-1}y_{i-2} \ldots y_1y_0 \rangle + y_i*U\alpha^{i-n-1}$
5) If $Y \geq \alpha^i$ then $Y \leftarrow \langle y_{i-1}y_{i-2} \ldots y_1y_0 \rangle + U*\alpha^{i-n-1}$ Notice that the reduction component Y mod $\alpha^i$ is computed by simply dropping the highest block $y_i$. It is further noted that the multiplication by powers of $\alpha$ is achieved through simple data shifting, rather than actual multiplication. Thus, very little processing resources are used.

To further demonstrate the operation of the computer-implemented method of FIGS. 3 and 4, consider the example where the processor computes "X mod M" using a five block integer X=45,397 written in base 10 and a two block modulus M=34. The partial modular reduction operation in stage one is computed by the data processor as follows, with reference to the corresponding steps in FIGS. 3 and 4:

EXAMPLE 1

X=45,397 so k+1=5; M=34 so n=2

Step 40: $X = \langle x_4x_3x_2x_1x_0 \rangle = \langle 45397 \rangle$

Step 42: $M = \langle m_1m_0 \rangle = \langle 34 \rangle$

Step 44: $U = \alpha^{n+1} \bmod M = 10^3 \bmod 34 = 14$

Step 46: Store U in Register U

Step 48 and 50: Set Y=X and Store in Register Y

Step 52: Initialize Count i=k=4 in Count Register

Step 56 (first pass i=4): $Y_R = \langle y_{i-1}y_{i-2} \ldots y_1y_0 \rangle + y_i*U*\alpha^{i-n-1}$ $Y_R = \langle 5397 \rangle + 4*14*10^{(4-2-1)} = \langle 5957 \rangle$ Step 58: No overflow flag, Branch "no"

Step 62: Put $Y_R$ in Register Y to be next Y

Step 64: i=4 is not equal to 2+1=3, Branch "no"

Step 66: Decrement Count i by 1 to 3

Step 56 (second pass i=3): $Y_R = \langle y_{i-1}y_{i-2} \ldots y_1y_0 \rangle + y_i*U*\alpha^{i-n-1}$ $Y_R = \langle 957 \rangle + 5*14*10^{(3-2-1)} = \langle 1027 \rangle$ Step 58: Overflow flag is set, Branch "yes"

Step 60: $Y_R = \langle y_{i-1}y_{i-2} \ldots y_1y_0 \rangle + U*\alpha^{i-n-1}$ $Y_R = \langle 027 \rangle + 14*10^{(3-2-1)} = \langle 041 \rangle$ Step 62: Put $Y_R$ in Register Y to be next Y Step 64: i=3 is equal to 2+1=3, Branch "yes"

The result of this stage one implementation applied to 45,397 mod 34 is 041, a three block number. The computer can be programmed to identify that the most significant block is a "0", indicating that the result of stage one actually yielded a partially reduced value Y that is only two blocks. In this case, a stage two reduction is not necessary. Instead, the processor can, if desired, continue directly to a stage three reduction to further reduce the partially reduced value Y to a remainder value R which has two blocks and is less than modulus 34.

Notice that the partially reduced value Y=041 is equivalent modulo 34 to the original number X=45,397. That is, $$041 \bmod 34 = 7 = 45397 \bmod 34$$

The method thereby replaces a large integer with an equivalent, but generally much smaller integer.

(b) Second Implementation: Compensate by Subtraction

Figure 5:
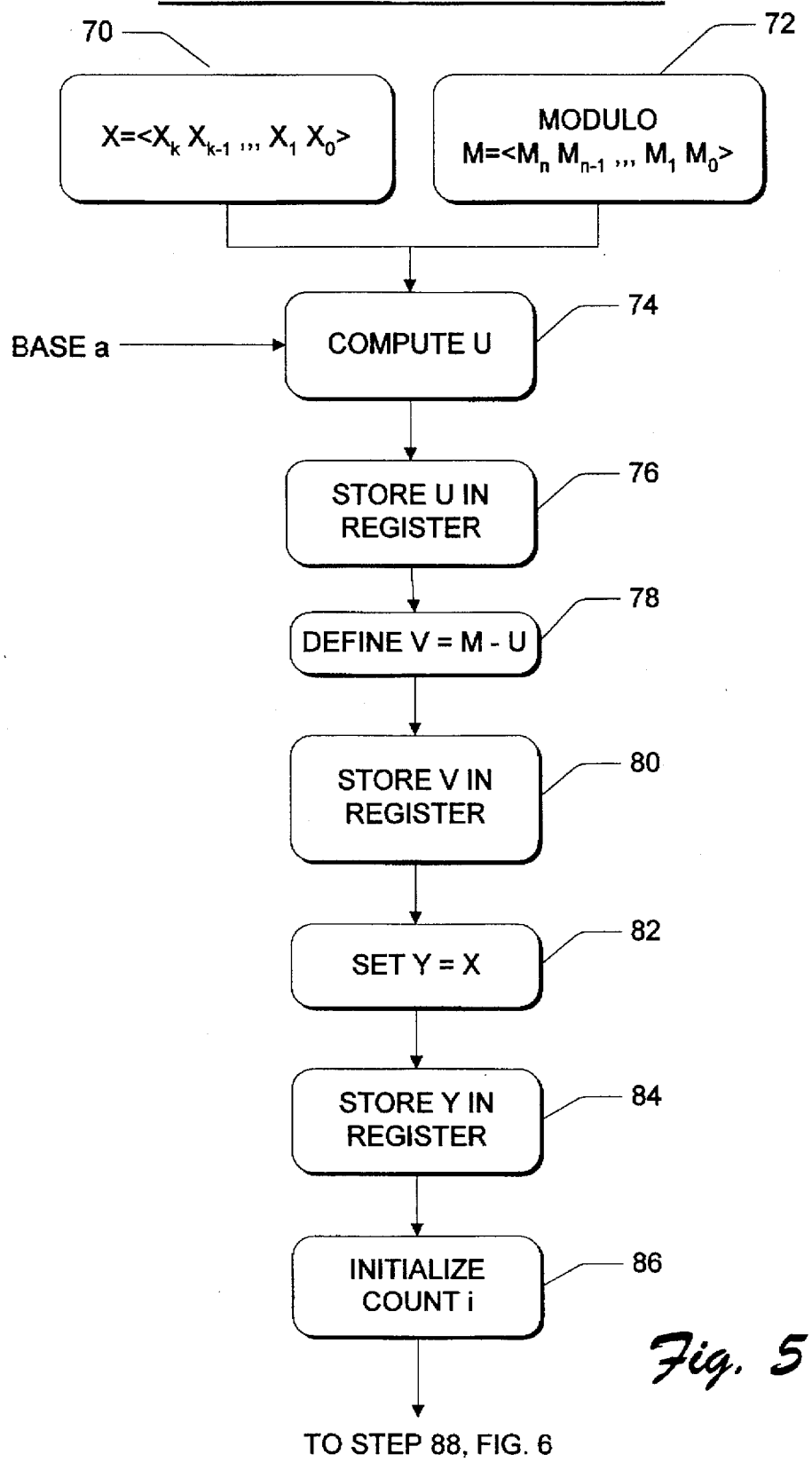
FIGS. 5 and 6 present a flow diagram of a second implementation of the stage one process for performing a modular reduction operation.
Figure 6:
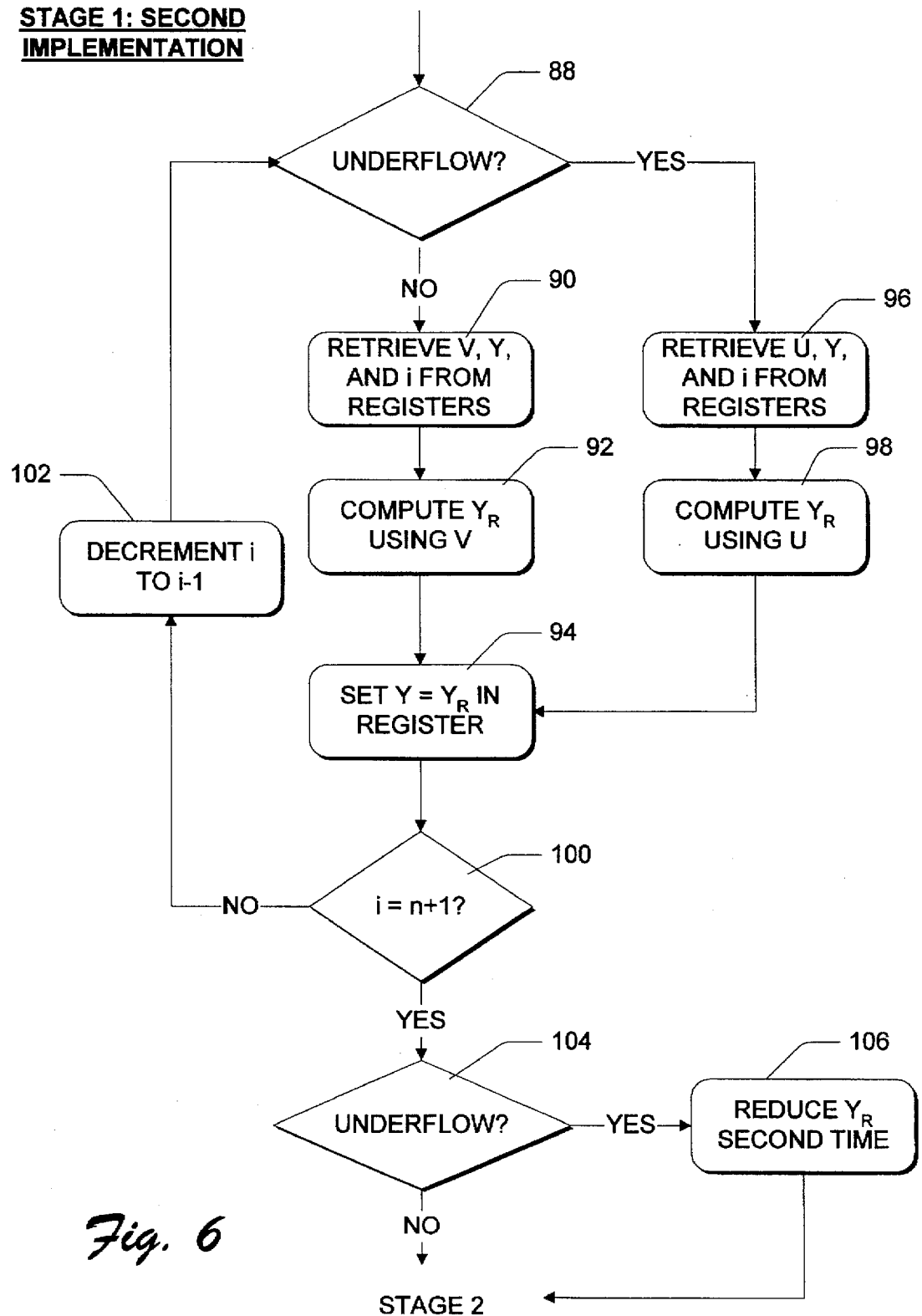

FIGS. 5 and 6 show a second version of a computer-implemented method for performing a modular reduction operation "X mod M" on a computer to arrive at a partially reduced value Y. At steps 70 and 72, the integer $X = \langle x_k x_{k-1} \ldots x_1 x_0 \rangle$ and the modulus $M = \langle m_{n-1}m_{n-2} \ldots m_1m_0 \rangle$ are supplied to the computer processor from memory, registers, or other computational circuits. At step 74, the computer processor is programmed to compute the constant U using a traditional modulo operation:

$$U = \alpha^{n+1} \bmod M.$$

The base $\alpha$ is either supplied to the processor from a register, or is inherently configured into the processor. The constant U is then stored in a register for later use (step 76). Next, a second constant V is defined at step 78, as follows:

$$V = M - U.$$

The constant V is also stored in a register for later use (step 80). Next, the data processor initially sets variable Y equal to the value X (step 82) so that value $Y = \langle y_k y_{k-1} \ldots y_1 y_0 \rangle = \langle x_k x_{k-1} \ldots x_1 x_0 \rangle$, where $y_k = x_k$, $y_{k-1} = x_{k-1}, \ldots, y_1 = x_1$, and $y_0 = x_0$. Variable Y is then stored in a temporary register or cache (step 84).

At step 86 in FIG. 5, the data processor initializes a count i in a count register to i=k for the reduce-and-compensate loop shown in FIG. 6. Next, at step 88 in FIG. 6, the data processor determines whether the value Y is positive or negative. In the first pass, the value Y will be positive or zero. But in subsequent passes, the compensation component (which is a subtraction operation in this second version) might yield a negative number. This will become more clear with the following discussion and examples.

When the value Y is negative, an underflow condition occurs, causing an underflow flag to be set in the processor. If the underflow flag is not set indicating that the value Y is not negative (i.e., the "no" branch from step 88), the value Y, constant V, and count i are retrieved from their respective registers (step 90 in FIG. 6) and the reduce-and-compensate operation is performed in step 92. The reduce-and-compensate operation in this second implementation is a reduce-and-subtract process that is represented by the following relationship:

$$Y_R = Y \bmod \alpha^i - y_i V^* \alpha^{i-n-1}$$

where $Y_R$ is a partially reduced value that is equivalent to the value Y modulo M. The processor replaces value Y in the register with the reduced value $Y_R$ in preparation for the next incremental reduce-and-compensate process (step 94).

With reference again to step 88, in the event that an underflow condition is present (i.e., the "yes" branch from step 88), the value Y, constant U, and count i are retrieved from their respective registers (step 96 in FIG. 6) and a modified reduce-and-subtract operation is performed in step 98 using the constant U, instead of the constant V. This modified operation is represented as follows:

$$Y_R = Y \bmod \alpha^i - y_i'^* U^* \alpha^{i-n-1}, \text{ where } y_i' = \alpha - y_i$$

This value of $Y_R$ is then stored in the register (step 94). At steps 100 and 102, the processor continues the reduce-and-subtract loop until the count i is equal to n+1, indicating that the number X has been reduced to a partially reduced value Y having n+1 blocks.

At step 104, one final check is made to see if there is an underflow condition. If there is, thereby indicating that Y is negative (i.e., the "yes" branch from step 104), the processor performs one last reduce-and-subtract process at step 106 before proceeding to stage two. This last step is represented as follows:

$$Y = Y \bmod \alpha^i - U$$

On the other hand, if the last Y is not negative (i.e., the "no" branch from step 104), flow continues directly to stage two, if desired.

The computer-implemented method of FIGS. 5 and 6 that is programmed into a data processor can be represented summarily by the following pseudo-code:

1) $U \leftarrow \alpha^{n+1} \bmod M$
2) $V \leftarrow M - U$
3) $Y \leftarrow X$
4) For $i \leftarrow k$ down to $n+1$ do
5) If $Y \geq 0$ then $Y \leftarrow <y_{i-1} y_{i-2} \cdots y_1 y_0> - y_i^* V^* \alpha^{i-n-1}$
6) Else $Y \leftarrow <y_{i-1} y_{i-2} \cdots y_1 y_0> - y_i'^* U^* \alpha^{i-n-1}$, where $y_i' = \alpha - y_i$
7) If $Y < 0$ then $Y \leftarrow <y_{i-1} y_{i-2} \cdots y_1 y_0> - U$ Again, the multiplication by powers of α are achieved through simple data shifting, rather than actual multiplication, thereby requiring very little processing resources. It should also be noted that the computation $y_i' = \alpha - y_i$ is an ordinary "two's-complement" operation which can be performed extremely quickly.

It is important to recognize that the subtractions done here do not behave as traditional integer subtractions when the results become negative. Instead, they correspond to the subtractions typically performed by computer logic where negative numbers are indicated by an underflow condition. For example, if the base α were equal to 10, then the subtraction 3−5 would not yield −2 but would instead "wrap" and yield 8 with an underflow condition indicating that the result should be interpreted as 10 less than 8.

Consider the example using the same five block integer X=45,397 written in base 10 and two block modulo M=34 as is used above in Example 1. The partial modular reduction operation in stage one is computed by a data processor as follows, with reference to the corresponding steps in FIGS. 5 and 6:

EXAMPLE 2(A)

X=45,397 so k+1=5; M=34 so n=2

Step 70: $X = <x_4 x_3 x_2 x_1 x_0> = <45397>$
Step 72: $M = <m_1 m_0> = <34>$
Step 74: $U = \alpha^{n+1} \bmod M = 10^3 \bmod 34 = 14$
Step 76: Store U in Register U
Step 78: V = M − U = 34 − 14 = 20
Step 80: Store V in Register V
Steps 82 and 84: Set Y=X and Store in Register Y
Step 86: Initialize Count i=k=4 in Count Register
Step 88: No underflow flag, Branch "no"
Step 92 (first pass i=4): $Y_R = <y_{i-1} y_{i-2} \cdots y_1 y_0> - y_i^* V^* \alpha^{i-n-1}$ $Y_R = <5397> - 4*20*10^{(4-2-1)} = <4597>$
Step 94: Put $Y_R$ in Register Y to be next Y
Step 100: i=4 is not equal to 2+1=3, Branch "no"
Step 102: Decrement Count i by 1 to 3
Step 88: No underflow flag, Branch "no"
Step 92 (second pass i=3): $Y_R = <y_{i-1} y_{i-2} \cdots y_1 y_0> - y_i^* V^* \alpha^{i-n-1}$ $Y_R = <597> - 4*20*10^{(3-2-1)} = <517>$
Step 94: Put $Y_R$ in Register Y to be next Y
Step 100: i=3 is equal to 2+1=3, Branch "yes"
Step 104: No underflow flag, Branch "no"

The result of this stage one implementation applied to 45,397 mod 34 is 517, a three block number. The partially reduced value Y=517 is equivalent in modulo 34 to the original number X=45,397, as follows:

$$517 \bmod 34 = 7 = 45397 \bmod 34$$

The second implementation is generally more efficient and faster than the first implementation. The second implementation only performs one computation per loop: the computation where Y is positive or zero or the modified computation where Y is negative. With reference to the pseudo-code for the second implementation, the processor only processes line (5) or line (6) each loop. In contrast, the first implementation might involve one or two computations per loop: the primary computation and a secondary computation if an overflow condition occurs. With reference to the pseudo-code for the first implementation, the processor might perform both lines (4) and (5) in the same loop. Accordingly, the second implementation is slightly faster.

The above example did not yield an underflow condition at step 88. To demonstrate this feature, consider the following Example 2(B) that begins with a number X=404,329 and modulus M=34.

EXAMPLE 2(B)

X=404,329 so k+1=6; M=34 so n=2
Step 70: $X = <x_5 x_4 x_3 x_2 x_1 x_0> = <404329>$ Step 72: $M=<m_1m_0>=<34>$ Step 74: $U=\alpha^{n+1} \bmod M = 10^3 \bmod 34 = 14$ Step 76: Store U in Register U Step 78: $V=M-U=34-14=20$ Step 80: Store V in Register V Steps 82 and 84: Set Y=X and Store in Register Y Step 86: Initialize Count i=k=5 in Count Register Step 88: No underflow flag, Branch "no"

Step 92 (first pass i=5): $Y_R=<y_{i-1}y_{i-2}\cdots y_1y_0>-y_i*V*\alpha^{i-n-1}$ $Y_R=<04329>-4*20*10^{(5-2-1)}=<(-1)96329>$ (Note: A processor performs the subtraction by the customary borrowing technique which, on paper for this example, looks like Y=104,329−8,000. Hence, the value is a "negative" 96,329, which is the two's complement of −3,671. The processor then accounts for a negative number by setting a flag or a binary "1" in a special underflow register which is represented here by the "−1" in parentheses.)

Step 94: Put $Y_R$ in Register Y to be next Y

Step 100: i=5 is not equal to 2+1=3, Branch "no"

Step 102: Decrement Count i by 1 to 4

Step 88: Underflow flag is set, Branch "yes"

Step 98 (second pass i=4): $Y_R\leftarrow<y_{i-1}y_{i-2}\cdots y_1y_0>-y_i'*U*\alpha^{i-n-1}$, $y_i'=\alpha-y_i$ $Y_R=<6329>-(10-9)*14*10^{(4-2-1)}=<6189>$ Step 94: Put $Y_R$ in Register Y to be next Y Step 100: i=4 is not equal to 2+1=3, Branch "no"

Step 102: Decrement Count i by 1 to 3

Step 88: No underflow flag, Branch "no"

Step 92 (third pass i=3): $Y_R=<y_{i-1}y_{i-2}\cdots y_1y_0>-y_i*V*\alpha^{i-n-1}$ $Y_R=<189>-6*20*10^{(3-2-1)}=<069>$ Step 100: i=3 is equal to 2+1=3, Branch "yes"

Step 104: No underflow flag, Branch "no"

Example 2(B) yields a result of 069, which is equivalent in modulo 34 to the original number 404,329. That is, 069 mod 34=1=404,329 mod 34

Stage 2

Figure 7:
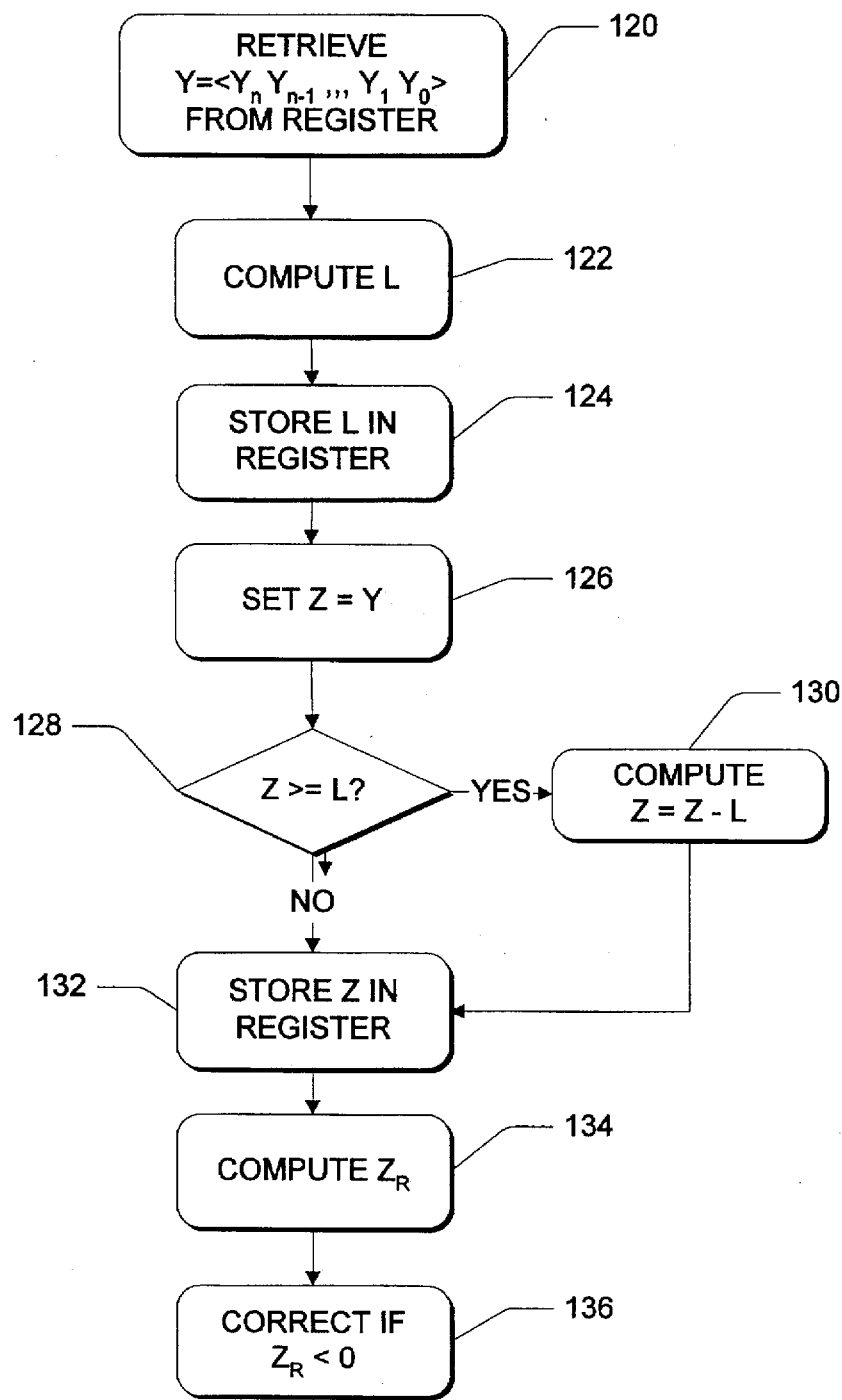
FIG. 7 is a flow diagram of a stage two process for performing a modular reduction operation.

FIG. 7 shows steps in the computer-implemented method for reducing the n+1 block integer $Y=<y_ny_{n-1}\cdots y_1y_0>$ computed in stage one to a modulo equivalent n block integer $Z=<z_{n-1}z_{n-2}\cdots z_1z_0>$. The modulus M remains an n block integer $M=<m_{n-1}m_{n-2}\cdots m_1m_0>$.

At step 120, the processor retrieves the n+1 block integer Y from its register. At step 122, the processor computes a new constant L according to the following relationship:

$$L=\alpha^n-(\alpha^n \bmod M)=<1_{n-1}1_{n-2}\cdots 1_11_0>$$

This computation of L can be streamlined in implementation. The constant L need only be a multiple of modulus M with its most significant block $1_{n-1}$ being greater than or equal to one-half of base $\alpha$. When base $\alpha$ is binary or some power of two (such as $\alpha=2^{32}$ for a 32-bit computer), the computation of L is achieved by taking the modulus M and shifting it leftward until the high order bit $1_{n-1}$ is a "1". The constant L is held in a register (step 124).

It should be briefly noted here that the computation of line (7) of the pseudo-code for "compensate by subtraction" of stage one can be performed using L instead of U. This would entail replacing line:

If $Y<0$ then $Y\leftarrow<y_{i-1}y_{i-2}\cdots y_1y_0>-U$ (7)

with the following lines:

If $Y<0$ then $Y\leftarrow Y+L$ (7A)

If $Y<0$ then $Y\leftarrow Y+L$ (7B).

Although this two lines for one replacement may seem more cumbersome for stage one, the result can sometimes speed stage two.

Once L has been computed, the data processor initially sets variable Z equal to the value Y (step 126) so that value $Z=<z_nz_{n-1}\cdots z_1z_0>=<y_ny_{n-1}\cdots y_1y_0>$, where $z_n=y_n$, $z_{n-1}=y_{n-1},\ldots, z_1=y_1$, and $z_0=y_0$. At step 128, the processor determines whether variable Z is greater than or equal to constant $L*\alpha$. If so (i.e., the "yes" branch from step 128), the processor replaces variable Z with the result of Z minus $L*\alpha$ (step 130); otherwise the original Z is kept. Variable Z is then stored in a temporary register or cache (step 132).

At step 134, the data processor computes a reduced value $Z_R$ according to the following relationship:

$$Z_R=Z-q*L, \text{ where quotient } q=<z_nz_{n-1}>\div 1_{n-1}$$

The reduced value $Z_R$ is an n block integer. There is a possibility that this computation might yield a negative number. Accordingly, the processor performs a correction step if $Z_R<0$ (step 136). The correction step is to replace $Z_R$ with the value $Z_R+L$. If this correction still yields a negative value, the step is repeated. The choice of L guarantees that the correction step is performed at most two times.

The computer-implemented method of FIG. 7 can be represented summarily by the following pseudo-code:

1) $L\leftarrow\alpha^n-(\alpha^n \bmod M)$
2) $Z\leftarrow Y$
3) If $Z\geq L*\alpha$ then $Z\leftarrow Z-L*\alpha$
4) $q\leftarrow<z_nz_{n-1}>\div 1_{n-1}$
5) $Z_R\leftarrow Z-q*L$
6) If $Z_R<0$ then $Z\leftarrow Z+L$
7) If $Z_R<0$ then $Z\leftarrow Z+L$ Consider an example using the same five block integer X=45,397 written in base $\alpha=10$ and two block modulus M=34 that is employed in Example 1. From Example 1 above, the partially reduced value computed in stage one was Y=041. With reference to the flow diagram of FIG. 7, Example 3(A) demonstrates a stage two reduction.

EXAMPLE 3(A)

Y=041; M=34 so n=2

Step 120: $Y=<y_2y_1y_0>=<041>$

Step 122: L=100−(100 mod 34)=68

Step 124: Store L in Register L

Step 126: Set $Z=Y=<041>$

Step 128: Z is not$\geq L*\alpha$, Branch "no"

Step 132: Store Z in Register Z

Step 134: $Z_R=Z-q*L$, where $q=<z_nz_{n-1}>\div 1_{n-1}=0$ $Z_R=041-(0)*68=<41>$ Step 136: No correction The result of the stage two reduction is 41. Note that the integer division to arrive at quotient q is a standard integer divide with a round down to the next integer. As obvious in this example (since the most significant block is a zero), the result $Z_R$ is a modulo equivalent of the partially reduced value Y; that is 041 mod 34=41 mod 34.

Now consider the example using the same X=45,397 and M=34, but continuing from Example 2(A) which produced a partially reduced value Y=517. With reference to the flow diagram of FIG. 7, Example 3(B) demonstrates a stage two reduction.

EXAMPLE 3(B)

Y=517; M=34 so n=2

Step 120: $Y=<y_2y_1y_0>=<517>$

Step 122: L=100–(100 mod 34)=68

Step 124: Store L in Register L

Step 126: Set Z=Y=<517>

Step 128: Z is not$\geq$L*$\alpha$, Branch "no"

Step 132: Store Z in Register Z

Step 134: $Z_R=Z-q*L$, where $q=<z_nz_{n-1}>+1_{n-1}=8$ $Z_R=517-(8)*68=<(-1)973>$ Step 136: $Z_R<0$, so $Z_R=Z_R+L=<(-1)973>+68=41$ Once again, the result of the stage two reduction is 41. The result $Z_R$ is an equivalent of the partial reduced value Y; that is 517 mod 34=41 mod 34=7.

Stage 3

The reduced value $Z_R$ computed in stage two is an n block integer that might be greater than, equal to, or less than modulus M. The third and final stage reduces the integer $Z_R$ to a modulo equivalent remainder integer R, such that $0 \leq R < M$. The processor performs the following modular reduction operation:

$$R = Z_R \bmod M.$$

This modulo operation is standard, and well-known in the art. It is not described in detail. For a more detailed discussion of this final stage, refer to a book entitled, *The Art of Computer Programming, vol. 2, Seminumerical Algorithms* by D. E. Knuth, 2nd edition, Addison-Wesley, Reading, Mass., 1981. This book is hereby incorporated by reference.

In our example, the stage two process yielded $Z_R=41$ which is greater than modulus M=34. Accordingly, the final step produces a final correct answer, as follows:

$$R = Z_R \bmod M = 41 \bmod 34 = 7$$

Computer Implementation

Figure 8:
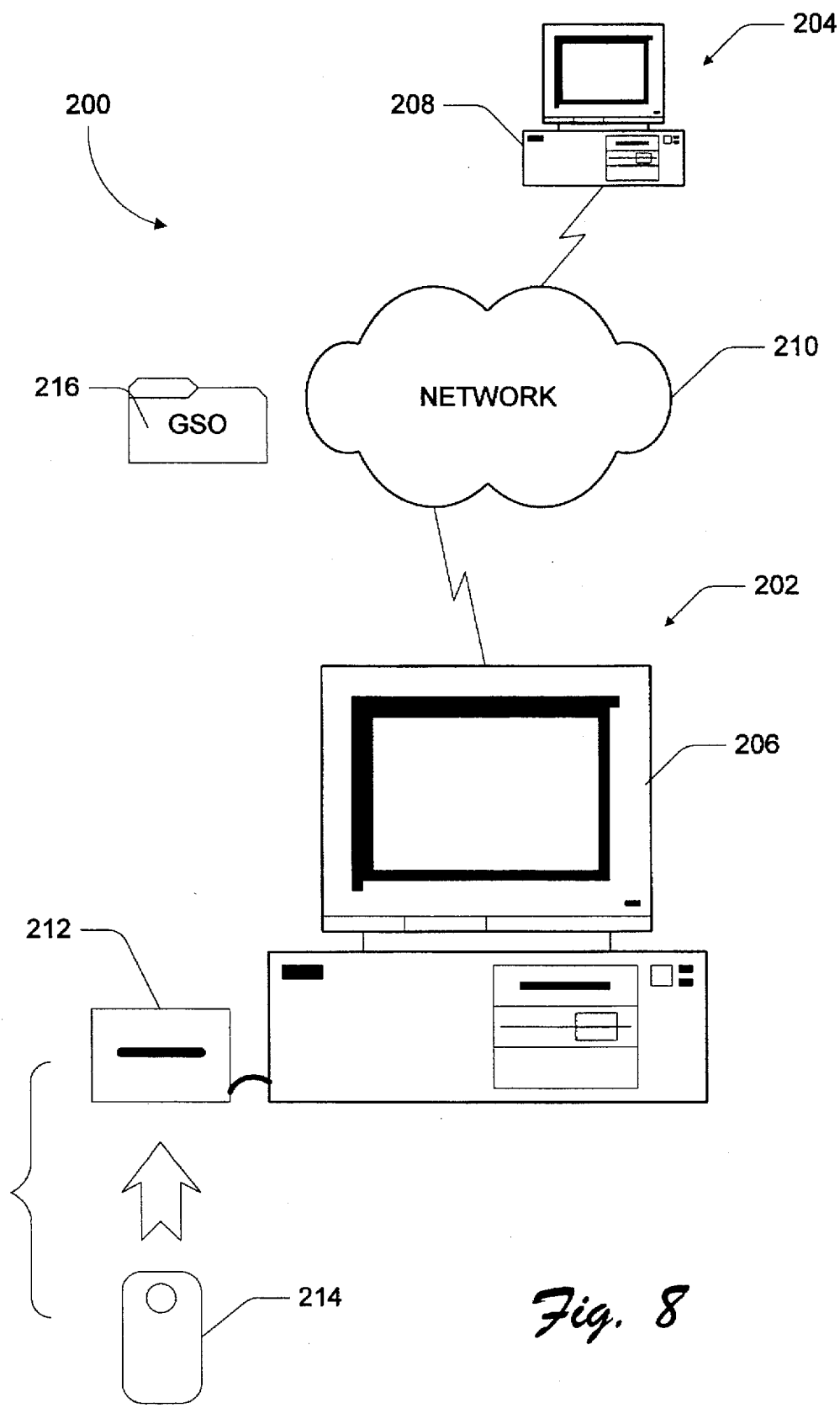
FIG. 8 is a diagrammatic illustration of an electronic commerce system that incorporates the computer-implemented method for performing modular reduction.
Figure 9:
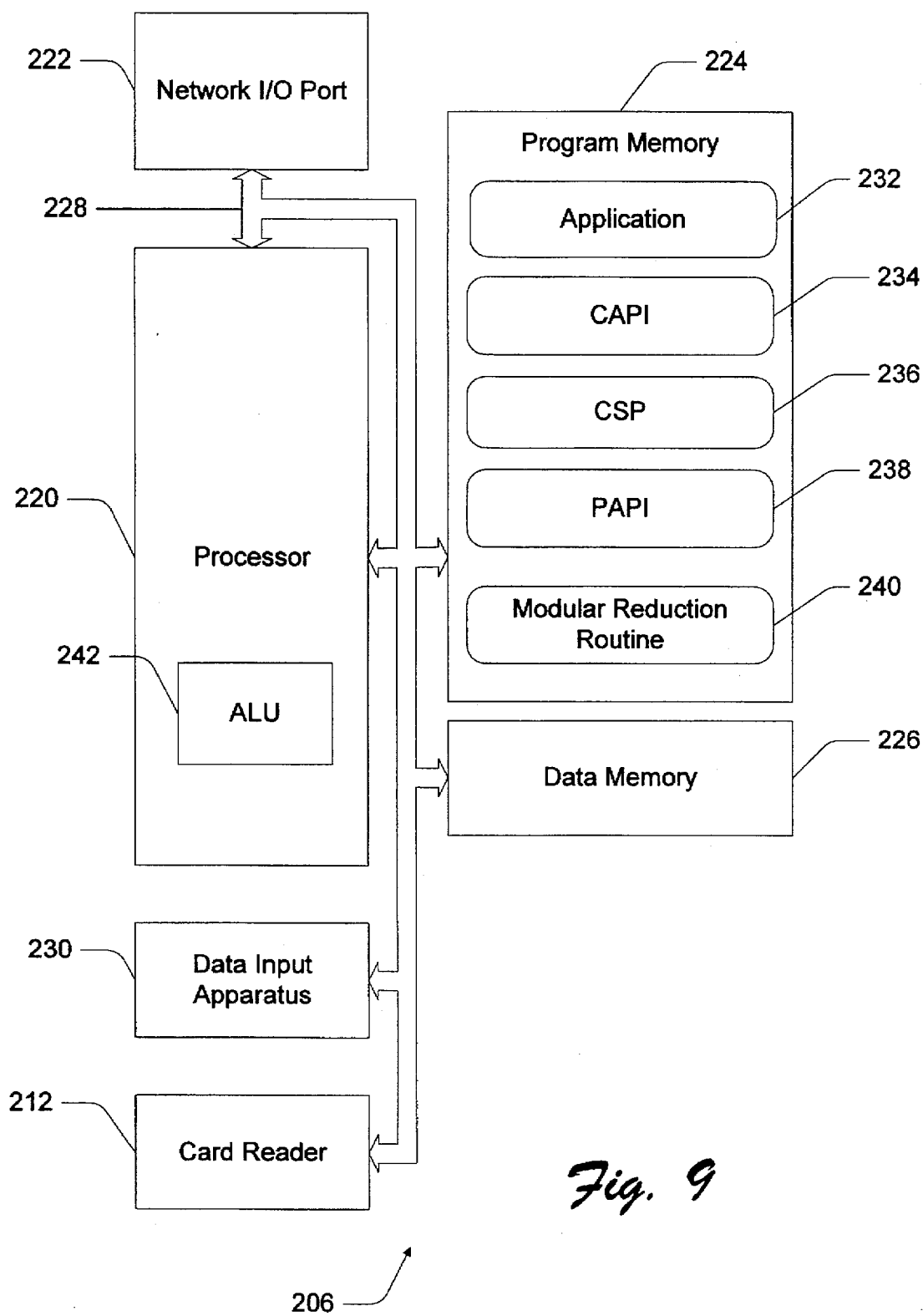
FIG. 9 is a block diagram of a computer used in the electronic commerce system that has the method programmed thereon.
Figure 10:
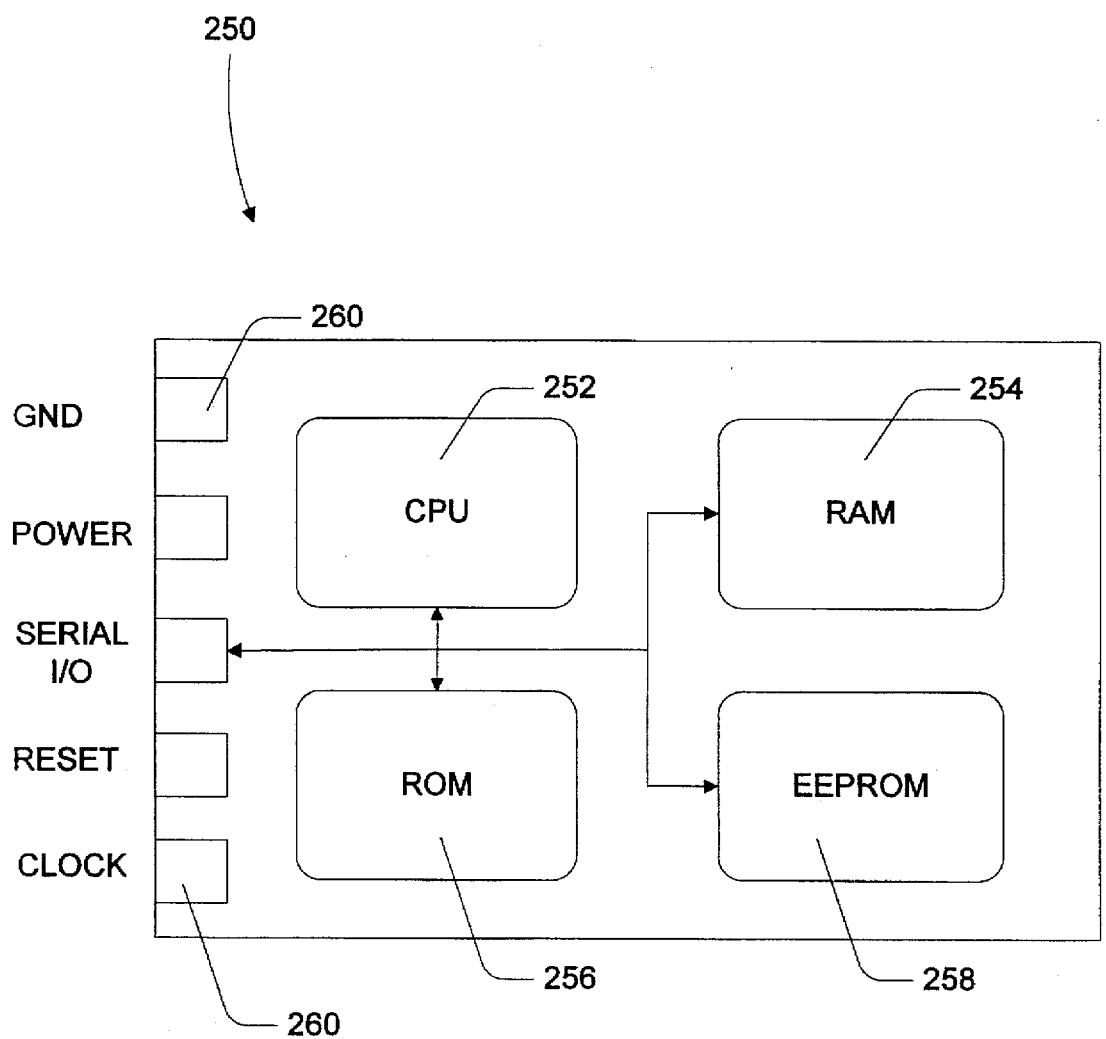
FIG. 10 is a block diagram of a smart card microcontroller that is configured to perform modular reduction operations according to the computer-implemented method.

FIGS. 8–10 show an exemplary embodiment of the computer-implemented method described above incorporated into a computer used in an electronic commerce system. FIG. 8 shows an electronic commerce system 200 for conducting secure electronic commerce transactions among multiple trading partners or participants, which are represented by two participants 202 and 204. A "participant" can be an individual person (such as a credit card holder, an ITV (interactive television) viewer, or a banking member at an automated teller machine), an entity or business (such as a merchant, cable operator, or service provider), or an institution (such as a bank).

Computing units 206 and 208 are provided by the respective participants 202 and 204. The computing units are depicted for illustration purposes as IBM®-compatible personal computers, although other forms of computing units may be used. For instance, the computing units might be embodied as conventional computers (such as mainframe computers, servers, PCs, laptops, notebooks, etc.) or as other computational machines, such as banking ATMs (automated teller machines) and set-top boxes used in an interactive television system.

The computing units 206 and 208 are interconnected with each other via one or more communication systems, represented by network 210. The communication systems can be embodied as a wire-based or wireless network. Examples of communications systems include an ATM (asynchronous transfer mode) switching network, a public network, a wide area network, an interactive television (ITV) network, a credit card network, a satellite network, and an RF network.

Each computing unit 206 and 208 might also be equipped with a card reader 212 to read identification cards 214 that are unique to the user. In the illustrated embodiment, card 214 is an integrated circuit (IC) card that is known as a smart card. A "smart card" is a card about the size and thickness of a credit card that has a built-in microcontroller (MCU) which enables the card to modify, or even create, data in response to external stimuli. The microcontroller is a single-wafer integrated circuit which is mounted on an otherwise plastic credit card. The smart card stores and protects the user's electronic commerce information, such as financial data, passwords, account numbers, etc.

The electronic commerce system 200 facilitates the secure exchange of commerce documents and commerce instruments over the communications system 210 which is assumed to be insecure and open to eavesdroppers. Each computing unit 206 and 208 is programmed to execute a commerce application that facilitates the computerized, electronic commerce system. To sustain the security and authentication functions of the electronic commerce system, the commerce application loaded on each computer 206 and 208 is capable of encrypting or decrypting messages, digitally signing the messages, and verifying the authenticity of the messages from other participants. These computations typically utilize numerous modular reduction operations. In the commerce context, these messages are in the form of commerce documents (e.g., purchase orders, contracts) and commerce instruments (e.g., payment instructions and currency). The cryptographic functions necessarily involve large integer computations, and namely, modular reduction operations involving data and cryptographic key pairs. The smart card can be used to store and protect the cryptographic key pairs of the cardholder that are used to gain access to a commerce application running on the computing unit 206 and to secure communication on the electronic commerce system. Accordingly, both the computing unit 206 and the smart card 214 are additionally programmed with a modular reduction routine embodying the reduce-and-compensate processes described above.

FIG. 9 shows a more detailed block diagram of computing unit 206. It has a processor 220, a network I/O port 222, a program memory 224, and a data memory 226 which are all interconnected via an internal multi-bit bus 228. The network I/O port 222 couples the computing unit 206 to the communication system employed in the electronic commerce system. For example, the network I/O port 206 might be in the form of a modem, network card, or the like. The computing unit 206 also includes a data input apparatus 230 (e.g., a keyboard, a mouse, a trackball, a keypad, etc.) and the smart card reader 212 which are both operatively coupled to the bus 228.

A commerce application 232 is stored in program memory 224 and executable on the processor 220. The commerce application is a software program that is tailored to the particular commerce activity in which the participant is involved. A cryptographic system which supports the commerce application 232 is also implemented in software that is stored in program memory 224 and executed on the processor 220.

In the illustrated embodiment, the cryptographic system comprises three layers: (1) a cryptographic application program interface (CAPI) 234, which provides functionality to the commerce application 232; (2) one or more cryptographic service providers (CSP) 236, which implement the cryptographic functionality presented by CAPI to the application; and (3) one or more private application program interfaces (PAPI) 238 which provide an interface between the CSPs and a user. As one example implementation, this cryptographic system could be incorporated into an operating system as a service layer to provide cryptographic services.

The CAPI layer 234 itself is thin. Its principal task is to select an appropriate CSP and verify its authenticity. When the commerce application 232 needs a sequence of cryptographic functions to be performed (e.g., encryption, decryption, signing), the application invokes the CAPI 234 to acquire a context associated with the appropriate CSP. The CAPI 234 then loads the CSP and verifies its authenticity.

The CSPs 236 implement the cryptographic functionality requested by the application. In general, the CSPs perform encryption key management, encryption/decryption services, authentication and key exchanging tasks, hashing routines, and digital signing. Preferably, a different CSP is configured to perform each of these functions, although a single CSP can be implemented to perform them all. The CSPs are preferably implemented in software as dynamic linked libraries (DLLs) that are dynamically accessible by the CAPI 234 using conventional loading techniques. The CSPs can be configured to store cryptographic key pairs or import them from the smart card, and keep the private keys secret without exposure to the commerce application. Additionally, the CSPs are configured to import cryptographic keys belonging to other participants for signature verification and encryption purposes.

The PAPI 238 permits the CSPs 236 to interact with the user through an implementation-dependent user interface. The PAPI 238 facilitates user confirmation prior to attaching the user's signature to mitigate the danger that a malicious application will obtain sensitive information. The PAPI 238 also verifies the authenticity of the user (via the smart card and user login sequence) that is operating at the computing unit prior to granting that user access to the application.

When a CSP 236 performs cryptographic functions, it performs a number of large integer computations. Most notably, modular exponentiation requires a substantial amount of processing resources. According to one implementation, the modular reduction method of this invention is implemented in a software routine stored in program memory 224. This modular reduction routine, referenced generally by numeral 240, is executed on the processor 220. In addition to program memory 224, the computer-implemented method can be stored on other forms of computer-readable memory, including a floppy diskette, a hard disk, a compact disk, an internal ROM, or an internal non-volatile RAM. The number X, constants U and V, the partial reduced value Y, and count i can be stored in memory locations or soft registers in volatile memory, such as volatile RAM or a cache. A more detailed discussion of an electronic commerce system can be found in a U.S. Patent Application filed Jun. 29, 1995, entitled "System and Method for Secure Electronic Commerce Transactions", by Barbara Fox et al., and assigned to Microsoft Corporation. This application is hereby incorporated by reference.

The modular reduction routine can alternately be implemented in hardware as a math processing unit, such as an ALU 242. During the reduction, the number X, the constants U and V, the partially reduced value Y, and the count i can all be stored in physical dedicated registers of ALU 242. In this manner, the ALU 242 forms one example means for performing the reduce-and-compensate process described above.

FIG. 10 shows one common construction of a smart card microcontroller IC 250. It includes a CPU 252, a volatile rewritable RAM (Random Access Memory) 254, a ROM (Read Only Memory) 256, and an EEPROM (Electrically Erasable Programmable ROM) 258. IC 250 also includes a set of couplings 260 in the form of conductive metal contacts which function as electrical data I/O couplings to external read/write equipment. Clock, reset, power, data I/O, and ground can be provided at IC contacts 260. One suitable microcontroller-based single-wafer IC that can be used in smart cards is available from Motorola Corporation under model number MC68HC05SC21. The smart card is of standard construction, and thus not described in any greater detail.

To assist the large integer computations performed by the smart card during cryptographic functions, the modular reduction method of this invention can be programmed into the EEPROM 258 of the smart card microcontroller IC and used to direct the CPU 252 during its modular reduction operations. If desired, a cryptographic system might also be programmed onto the smart card.

With reference again to FIGS. 8 and 9, each commerce transaction has an originating participant, represented by participant 202, and one or more recipient participants, represented by participant 204. Suppose that participant 202 wants to send an encrypted message to recipient participant 204, the originating participant 202 first devises a message using the commerce application 232. The application 232 supplies the plaintext message to the CAPI 234 to be encrypted and signed. An example plaintext message is a goods and services order, referenced generally as number 216 in FIG. 8. The CAPI 234 selects the appropriate CSP 236 (or CSPs) to perform the encryption and signing, and verifies the authenticity of the selected CSP.

Once the CSP is authenticated, the CAPI 234 passes the plaintext message to the CSP 236 for encryption. The CSP hashes the plaintext message into a cryptographic digest. During this time, the PAPI 238 presents an explanation of the transaction to the user for confirmation or denial. If the user authorizes the transaction, the PAPI 238 returns a confirmation to the CSP 236 and the CSP attaches the originator's digital signature to the message by encrypting the cryptographic digest (hash) using the originator's private key of the signing pair. The CSP 236 returns the signed and encrypted message to the CAPI 234, which passes it onto the commerce application 232.

The hash computation and encryption both require large integer computations. For the widely-used RSA cipher, encryption is performed using modular exponentiation. For instance, to encrypt the cryptographic digest CD, the processor performs the following computations to compute the encrypted message T':

$$T' = (CD)^E \bmod M$$

To perform this computation, the processor performs numerous multiplications and modular reductions.

The three stage computer-implemented method described above with reference to FIGS. 1–7 is used extensively in computing this modular exponentiation. The method significantly improves the speed of computing modular reduction operations, and thus, improves the overall cryptographic process.

This method is also advantageous for use in processors of limited size or space constraint, such as common 8-bit or 16-bit CPUs used on smart cards. The method can be "in-lined" to keep intermediate results small without substantially increasing computational costs. Computations involving large integers are partially reduced each time to ensure that the result has a certain size that can be efficiently handled by the processor. The additional "in-line" computation is not very extensive or time consuming, and thus, is not computationally expensive.

The method offers other additional advantages over the prior art techniques for performing the modular reduction operation. First, the method is conceptually much simpler than the prior art technique proposed by Montgomery and discussed in the Background of the Invention section. For instance, there is no conversion to an entirely different form. Second, the method can accommodate both even and odd integers of any length.

Experimental Example

The inventors implemented a prototype of the modular reduction method using Microsoft Visual C++ 2.2 on a 66 MHz Pentium™ based PC. The modular reduction method performed the modular exponentiation operation used in public-key cryptography for two different argument lengths: a 512-bit argument and a 1024-bit argument. A second test was conducted on the same PC using the well-known Montgomery technique. The following results were observed, and are listed below in milliseconds (ms):

| Argument Length | Montgomery (ms) | Present Method (ms) |
|---|---|---|
| 512 | 89.1 | 85 |
| 1024 | 542 | 526 |

Notice that the present method improved speed by approximately 3%–5% over the widely-used Montgomery technique.

Other Applications

In addition to the described cryptography context, the computer-implemented method can be used in other contexts that involve large integer computations. Examples of such contexts include privacy and security (e.g., logon procedures, passkeys, etc.), anti-piracy, and factoring. Such contexts are used in network computing, interactive television, communications systems, electronic commerce, electronic financial applications (banking or investing), and on-line service applications. The method can be easily implemented in software and executed on a computer, used in a "smart-card", or configured into the hardware of the computer. Accordingly, the computer-implemented method has wide applicability.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

I claim:

1. In an electronic system involving transmission of data over a network between two computing units, a computer-implemented method comprising the following steps:

sending data from one computing unit to another; and processing the data at one of the computing units using a modular reduction operation "X mod M," where X is a number with k+1 blocks written in base $\alpha$, $X=<x_k x_{k-1} \ldots x_1 x_0>$, and M is a modulus having n blocks, $M=<m_{n-1} m_{n-2} \ldots m_1 m_0>$, and $n<k+1$, said processing step comprising defining a constant U that is equal to $\alpha^{n+1}$ mod M, reducing the number X by an integer multiple of $\alpha^{n+1}$ to yield an intermediate value that is less than the number X but greater than zero, and compensating for reduction of the number X by adjusting the intermediate value by an amount that is one of (1) an integer multiple of the constant U or (2) an integer multiple of a constant V, where V=M−U, to yield an incrementally reduced value $X_R$ that is equivalent modulo M to the number X.

2. A computer-implemented method as recited in claim 1 wherein the processing step comprises adding the integer multiple of the constant U to the intermediate value.

3. A computer-implemented method as recited in claim 1 wherein the processing step comprises subtracting the integer multiple of the constant V from the intermediate value.

4. A computer-implemented method as recited in claim 1 wherein the processing step comprises subtracting the integer multiple of the constant U from the intermediate value.

5. A computer-implemented method as recited in claim 1 wherein the processing step comprises computing an intermediate value that is equal to X mod $\alpha^k$.

6. A computer-implemented method as recited in claim 1 wherein the processing step comprises deleting a most significant block $x_k$ from the number X to yield the intermediate value.

7. A computer-implemented method as recited in claim 1 wherein the processing step comprises subtracting a product of a most significant block $x_k$ multiplied by $\alpha^k$ from the number X to yield the intermediate value.

8. A computer-implemented method as recited in claim 1 wherein the processing step comprises computing X mod $\alpha^k$ to yield the intermediate value.

9. A computer-implemented method as recited in claim 1 wherein the processing step comprises adding to the intermediate value an amount equal to a product $x_k*U*\alpha^{k-n-1}$.

10. A computer-implemented method as recited in claim 1 wherein the processing step comprises one of the following:

in an event that $X \geq 0$, subtracting an amount that is equal to a product $x_k*V*\alpha^{k-n-1}$ from the intermediate value; and in an event that $X<0$, subtracting an amount that is equal to a product $x_k'*U*\alpha^{k-n-1}$, where $x_k'=\alpha-x_k$, from the intermediate value.

11. In an electronic system involving transmission of data over a network between two computing units, a computer-implemented method comprising the following steps:

sending data from one computing unit to another; and processing the data at one of the computing units using a modular reduction operation "X mod M," where X is a number with k+1 blocks written in base $\alpha$, $X=<x_k x_{k-1} \ldots x_1 x_0>$, and M is a modulus having n blocks, $M=<m_{n-1} m_{n-2} \ldots m_1 m_0>$, and $n<k+1$, said processing step comprising:

a) computing a constant $U=\alpha^{n+1}$ mod M;

b) storing the constant U in a constant register;

c) establishing a value $Y=<y_k y_{k-1} \ldots y_1 y_0>$ that is equal to the number X so that $y_k=x_k$, $y_{k-1}=x_{k-1}, \ldots y_1=x_1$, and $y_0=x_0$;

d) storing Y in an intermediate value register;

e) initializing a count i=k in a count register;

f) retrieving the constant U from the constant register, the value Y from the intermediate value register, and the count i from the count register;

g) computing a partially reduced value $Y_R=Y$ mod $\alpha^i + y_i^* U^* \alpha^{i-n-1}$, the partially reduced value $Y_R$ being equivalent to Y modulo M; and h) storing the partially reduced value $Y_R$ in the intermediate value register to replace the value Y, whereby $Y=Y_R$ for any subsequent modular reduction.

12. A computer-implemented method as recited in claim 11 wherein in an event that the computing step (g) yields a partially reduced value of $Y_R \geq \alpha^i$, the computing step (g) additionally comprises further reducing the partially reduced value $Y_R$ by replacing the partially reduced value $Y_R$ with an amount equal to $Y_R$ mod $\alpha^i + U^* \alpha^{i-n-1}$.

13. A computer-implemented method as recited in claim 11, wherein said processing step further comprises the following additional steps:

i) decrementing the count i in the count register; and j) in an event that count $i \geq n+1$, repeating steps (f)–(h).

14. In an electronic system involving transmission of data over a network between two computing units, a computer-implemented method comprising the following steps:

sending data from one computing unit to another; and processing the data at one of the computing units using a modular reduction operation "X mod M," where X is a number with k+1 blocks written in base $\alpha$, $X=<x_k x_{k-1} \ldots x_1 x_0>$, and M is a modulus having n blocks, $M=<m_{n-1} m_{n-2} \ldots m_1 m_0>$, and $n<k+1$, said processing step comprising:

a) computing a constant $U=\alpha^{n+1}$ mod M;

b) storing the constant U in a first constant register;

c) computing a constant $V=M-U$;

d) storing the constant V in a second constant register;

e) establishing a value $Y=<y_k y_{k-1} \ldots y_1 y_0>$ that is equal to the number X so that $y_k=x_k$, $y_{k-1}=x_{k-1}, \ldots y_1=x_1$, and $y_0=x_0$;

f) storing Y in an intermediate value register;

g) initializing a count i=k in a count register;

h) determining whether $Y \geq 0$;

i) in the event that the step (h) determination yields $Y \geq 0$, then performing steps of (1) retrieving the constant V from the second constant register, the value Y from the intermediate value register, and the count i from the count register, and (2) computing a partially reduced value $Y_R=Y$ mod $\alpha^i - y_i^* V^* \alpha^{i-n-1}$, the partially reduced value $Y_R$ being equivalent to the value Y modulo M;

j) in the event that the step (h) determination yields $Y<0$, then performing steps of (1) retrieving the constant U from the first constant register, the value Y from the intermediate value register, and the count i from the count register, and (2) computing a partially reduced value $Y_R=Y$ mod $\alpha^i - y_i'^* U^* \alpha^{i-n-1}$ where $y_i'=\alpha-y_i$, the partially reduced value $Y_R$ being equivalent to Y modulo M; and k) storing the partially reduced value $Y_R$ in the intermediate value register to replace the value Y, whereby $Y=Y_R$ for any subsequent modular reduction.

15. A computer-implemented method as recited in claim 14, wherein the processing step further comprises the following additional steps:

l) decrementing the count i in the count register; and m) in an event that count $i \geq n+1$, repeating steps (h)–(k).

16. A computer-implemented method as recited in claim 15, wherein the processing step further comprises the following additional step:

n) in an event that, subsequent to step (m), the partially reduced value $Y_R<0$, computing $Y_R=Y_R$ mod $\alpha^{n+1}-U$.

17. A computer for performing at least partially a modular reduction operation "X mod M" where X is a number with k+1 blocks written in base $\alpha$, $X=<x_k x_{k-1} \ldots x_1 x_0>$, and M is a modulus having n blocks, $M=<m_{n-1} m_{n-2} \ldots m_1 m_0>$, and $n<k+1$, the computer comprising:

a data processor;

said data processor being programmed with computer-executable instructions, including:

(a) computer-executable instructions to direct the data processor to precompute a constant U that is equal to $\alpha^{n+1}$ mod M;

(b) computer-executable instructions to direct the data processor to reduce the number X by an integer multiple of $\alpha^{n+1}$ to yield an intermediate value that is less than the number X but greater than zero; and (c) computer-executable instructions to direct the data processor to compensate for reduction of the number X by adjusting the intermediate value by an amount that is one of (1) an integer multiple of the constant U or (2) an integer multiple of a constant V, where $V=M-U$, to yield an incrementally reduced value $X_R$ that is equivalent modulo M to the number X.

18. A computer as recited in claim 17 wherein the data processor is further programmed with computer-executable institutions to direct the data processor to add the integer multiple of the constant U to the intermediate value.

19. A computer as recited in claim 17 wherein the data processor is further programmed with computer-executable instructions to direct the data processor to subtract the integer multiple of the constant V from the intermediate value.

20. A computer as recited in claim 17 wherein the data processor is further programmed with computer-executable instructions to direct the data processor to subtract the integer multiple of the constant U from the intermediate value.

21. A computer as recited in claim 17 wherein the data processor is further programmed with computer-executable instructions to direct the data processor to delete a most significant block $x_k$ from the number X to yield the intermediate value.

22. A computer as recited in claim 17 wherein the data processor is further programmed with computer-executable instructions to direct the data processor to subtract a product of a most significant block $x_k$ multiplied by $\alpha^k$ from the number X to yield the intermediate value.

23. A computer as recited in claim 17 wherein the data processor is further programmed with computer-executable instructions to direct the data processor to compute X mod $\alpha^k$ to yield the intermediate value.

24. A computer as recited in claim 17 wherein the data processor is further programmed with computer-executable instructions to direct the data processor to reduce the number X to an intermediate value that is equal to X mod $\alpha^k$.

25. A computer as recited in claim 17 wherein the data processor is further programmed with computer-executable instructions to direct the data processor to add to the intermediate value an amount that is equal to a product $x_k^* U^* \alpha^{k-n-1}$.

26. A computer as recited in claim 17 wherein the data processor is further programmed with computer-executable instructions to direct the data processor to:

in an event that $X \geq 0$, subtract an amount that is equal to a product $x_k^* V^* \alpha^{k-n-1}$ from the intermediate value; and in an event that X<0, subtract an amount that is equal to a product $x_k'*U*\alpha^{k-n-1}$ where $x_k'=\alpha-x_k$, from the intermediate value.

27. A computer for performing at least partially a modular reduction operation "X mod M" where X is a number with k+1 blocks written in base $\alpha$, $X=<x_k x_{k-1} \ldots x_1 x_0>$, and M is a modulus having n blocks, $M=<m_{n-1} m_{n-2} \ldots m_1 m_0>$, and n<k+1, the computer comprising:

a data processor;

said data processor being programmed with computer-executable instructions, including:

(a) computer-executable instructions to direct the data processor to precompute a constant $U=\alpha^{n+1}$ mod M; and (b) computer-executable instructions to direct the data processor to compute an incrementally reduced value $X_R$=X mod $\alpha^k+x_k*U*\alpha^{k-n-1}$ where the incrementally reduced value $X_R$ is equivalent to X modulo M.

28. A computer as recited in claim 27 wherein the computer-executable instructions of part (b) direct the data processor to iteratively compute the reduced value $X_R$ for iterations i=k down to n+1.

29. A computer as recited in claim 27 wherein the computer-executable instructions of part (b) direct the data processor to iteratively compute the reduced value $X_R$ for iterations i=k down to i>n+1.

30. A computer for performing at least partially a modular reduction operation "X mod M" where X is a number with k+1 blocks written in base $\alpha$, $X=<x_k x_{k-1} \ldots x_1 x_0>$, and M is a modulus having n blocks, $M=<m_{n-1} m_{n-2} \ldots m_1 m_0>$, and n<k+1, the computer comprising:

a data processor;

said data processor being programmed with computer-executable instructions, including:

(a) computer-executable instructions to direct the data processor to precompute a constant $U=\alpha^{n+1}$ mod M;

(b) computer-executable instructions to direct the data processor to precompute a constant V=M−U;

(c) computer-executable instructions to direct the data processor to determine whether X≧0;

(d) in the event that X≧0, computer-executable instructions to direct the data processor to compute $X_R$=X mod $\alpha^k-x_k*V*\alpha^{k-n-1}$; and (e) in the event that X<0, computer-executable instructions to direct the data processor to compute $X_R$=X mod $\alpha^k-x_k'*U*\alpha^{k-n-1}$ where $x_k'=\alpha-x_k$.

31. A computer as recited in claim 30 wherein the computer-executable instructions of parts (c)–(e) direct the data processor to iteratively compute the reduced value $X_R$ for iterations i=k down to n+1.

32. A computer as recited in claim 30 wherein the computer-executable instructions of parts (c)–(e) direct the data processor to iteratively compute the reduced value $X_R$ for iterations i=k down to i>n+1.

33. A math processing unit for performing at least partially a cryptographic function using a modular reduction operation "X mod M" where X is a number with k+1 blocks written in base $\alpha$, $X=<x_k x_{k-1} \ldots x_1 x_0>$, and M is a modulus having n blocks, $M=<m_{n-1} m_{n-2} \ldots m_1 m_0>$, and n<k+1, the math processing unit comprising:

a first register to store the number X;

a second register to store a precomputed constant U, where $U=\alpha^{n+1}$ mod M; and means coupled to receive the number X from the first register and to receive the precomputed constant U from the second register for computing a cryptographic function by, in part, modularly reducing the number X to produce an incrementally reduced value $X_R$ that is equal to X mod $\alpha^k+x_k*U*\alpha^{k-n-1}$.

34. A math processing unit as recited in claim 33 wherein said means is configured for calculating an incrementally reduced value $X_R$ by (1) deleting a most significant block $x_k$ from the number X to provide an intermediate value and (2) adding a product $x_k*U*\alpha^{k-n-1}$ to the intermediate value.

35. A math processing unit as recited in claim 33 wherein the means is configured for calculating an incrementally reduced value $X_R$ by (1) subtracting a product $x_k*\alpha^k$ from the number X and (2) adding a product $x_k*U*\alpha^{k-n-1}$ to the result of the subtraction.

36. A math processing unit as recited in claim 33 wherein the means is configured for calculating an incrementally reduced value $X_R$ by (1) subtracting X mod $\alpha^k$ to provide an intermediate value, and (2) adding a product $x_k*U*\alpha^{k-n-1}$ to the intermediate value.

37. A microprocessor comprising a math processing unit as recited in claim 33.

38. A smart card comprising a math processing unit as recited in claim 33.

39. A math processing unit for performing at least partially a cryptographic function using a modular reduction operation "X mod M" where X is a number with k+1 blocks written in base $\alpha$, $X=<x_k x_{k-1} \ldots x_1 x_0>$, and M is a modulus having n blocks, $M=<m_{n-1} m_{n-2} \ldots m_1 m_0>$, and n <k+1, the math processing unit comprising:

a first register to store the number X;

a second register to store a precomputed constant U, where $U=\alpha^{n+1}$ mod M;

a third register to hold a precomputed constant V, where V=M−U; and means coupled to receive the number X from the first register, to receive the precomputed constant U from the second register, and to receive the precomputed constant V from the third register, for computing a cryptographic function by, in part, modularly reducing the number X to an incrementally reduced value $X_R$ that is equal to either (1) X mod $\alpha^k-x_k*V*\alpha^{k-n-1}$ in the event that X≧0, or (2) X mod $\alpha^k-x_k'*U*\alpha^{k-n-1}$, where $x_k'=\alpha-x_k$, in the event that X<0.

40. A math processing unit as recited in claim 39 wherein the means is configured for calculating an incrementally reduced value $X_R$ by (1) deleting a most significant block $x_k$ from the number X to provide an intermediate value, and (2) subtracting from the intermediate value either (a) a product $x_k*V*\alpha^{k-n-1}$ in the event that X≧0, or (b) a product $x_k'*U*\alpha^{k-n-1}$ in the event that X<0.

41. A math processing unit as recited in claim 39 wherein the means is configured for calculating an incrementally reduced value $X_R$ by (1) subtracting a product $x_k*\alpha^k$ from the number X, and (2) further subtracting either (a) a product $x_k*V*\alpha^{k-n-1}$ in the event that X≧0, or (b) a product $x_k'*U*\alpha^{k-n-1}$ in the event that X<0.

42. A math processing unit as recited in claim 39 wherein the means is configured for calculating an incrementally reduced value $X_R$ by (1) subtracting X mod $\alpha^k$ to provide an intermediate value, and (2) subtracting from the intermediate value either (a) a product $x_k*V*\alpha^{k-n-1}$ in the event that X≧0, or (b) a product $x_k'*U*\alpha^{k-n-1}$ in the event that X<0.

43. A microprocessor comprising a math processing unit as recited in claim 39.

44. A smart card comprising a math processing unit as recited in claim 39.

45. A computer-readable memory used to direct a computer to perform at least partially a modular reduction operation "X mod M" where X is a number with k+1 blocks written in base $\alpha$, $X=<x_k x_{k-1} \ldots x_1 x_0>$, and M is a modulus having n blocks, $M=<m_{n-1} m_{n-2} \ldots m_1 m_0>$, and n<k+1, the computer-readable memory having computer-executable instructions for directing the computer, including:

(a) computer-executable instructions to direct the computer to precompute a constant U that is equal to $\alpha^{n+1}$ mod M;

(b) computer-executable instructions to direct the computer to reduce the number X by an integer multiple of $\alpha^{n+1}$ to yield an intermediate value that is less than the number X but greater than zero; and (c) computer-executable instructions to direct the computer to compensate for reduction of the number X by adjusting the intermediate value by an amount that is one of (1) an integer multiple of the constant U or (2) an integer multiple of a constant V, where V=M−U, to yield an incrementally reduced value $X_R$ that is equivalent modulo M to the number X.

46. A computer-readable memory as recited in claim 45, wherein the computer-executable instructions of part (b) direct the computer to reduce the number X to an intermediate value that is equal to X mod $\alpha^k$.

47. A computer-readable memory as recited in claim 16, wherein the computer-executable instructions of part (c) direct the computer to add to the intermediate value an amount that is equal to a product $x_k * U * \alpha^{k-n-1}$.

48. A computer-readable memory as recited in claim 16, wherein the computer-executable in instruction of part (c) direct the computer to:

in an event that $X \geq 0$, subtract an amount that is equal to a product $x_k * V * \alpha^{k-n-1}$ from the intermediate value; and in an event that $X \geq 0$, subtract an amount that is equal to a product $x_k' * U * \alpha^{k-n-1}$ where $x_k' = \alpha - x_k$, from the intermediate value.

49. A smart card comprising a computer-readable memory as recited in claim 45.

50. In a cryptographic system, a computer-implemented method comprising the following steps:

processing a message according to a cryptographic function; and said processing step including to at least partially computing a modular reduction operation "X mod M" as part of the cryptographic function, where X is a number with k+1 blocks written in base $\alpha$, $X=<x_k x_{k-1} \ldots x_1 x_0>$, and M is a modulus having n blocks, $M=<m_{n-1} m_{n-2} \ldots m_1 m_0>$, and n<k+1, said computing comprising the following steps:

defining a constant U that is equal to $\alpha^{n+1}$ mod M;

reducing the number X by an integer multiple of $\alpha^{n+1}$ to yield an intermediate value that is less than the number X but greater than zero; and compensating for reduction of the number X by adjusting the intermediate value by an amount that is one of (1) an integer multiple of the constant U or (2) an integer multiple of a constant V, where V=M−U, to yield an incrementally reduced value $X_R$ that is equivalent modulo M to the number X.

* * * * *